US011900872B2

(12) United States Patent
Yamamoto et al.

(10) Patent No.: US 11,900,872 B2
(45) Date of Patent: Feb. 13, 2024

(54) DISPLAY DEVICE

(71) Applicant: SHARP KABUSHIKI KAISHA, Sakai (JP)

(72) Inventors: Kaoru Yamamoto, Osaka (JP); Ryo Yonebayashi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 183 days.

(21) Appl. No.: 17/437,812

(22) PCT Filed: Mar. 29, 2019

(86) PCT No.: PCT/JP2019/013971
§ 371 (c)(1),
(2) Date: Sep. 9, 2021

(87) PCT Pub. No.: WO2020/202243
PCT Pub. Date: Oct. 8, 2020

(65) Prior Publication Data

US 2022/0199012 A1 Jun. 23, 2022

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2310/0286* (2013.01); *G09G 2310/08* (2013.01)

(58) Field of Classification Search
CPC ............... G09G 3/3233; G09G 3/3266; G09G 2300/0842; G09G 2310/0286; G09G 2310/08; G09G 2320/0295
See application file for complete search history.

(56) References Cited

U.S. PATENT DOCUMENTS

2017/0186373 A1 6/2017 Nishikawa et al.
2018/0082642 A1 3/2018 Yamanaka et al.

FOREIGN PATENT DOCUMENTS

WO 2015/190407 A1 12/2015
WO 2016/158745 A1 10/2016

*Primary Examiner* — Stacy Khoo
(74) *Attorney, Agent, or Firm* — ScienBiziP, P.C.

(57) ABSTRACT

To make a frame size of a display device having an external compensation function smaller than those of the known display devices.

Each of a plurality of unit circuits configuring a gate driver includes a first output control transistor including a second conduction terminal connected to a first output terminal-connected to another unit circuit and a control terminal connected to a first internal node, a second output control transistor including a second conduction terminal connected to a second output terminal configured to output an on level signal for at least a part of a monitoring period and a control terminal connected to a second internal node, and an output circuit control transistor including a first conduction terminal connected to the first internal node and a second conduction terminal connected to the second internal node. A potential to be applied to a control terminal of the output circuit control transistor is switched between a potential of a high level and a potential of a low level.

20 Claims, 32 Drawing Sheets

DISPLAY DEVICE

TECHNICAL FIELD

The present disclosure relates to a display device and a driving method therefor, and more specifically, relates to a display device provided with a pixel circuit including a display element to be driven by a current of an organic EL element, or the like, and a driving method therefor.

BACKGROUND ART

In recent years, organic ElectroLuminescence (EL) display devices provided with pixel circuits including organic EL elements have been coming into practical use. The organic EL elements are also called Organic Light-Emitting Diodes (OLEDs), each of which is a self-luminous type display element configured to emit light at a luminance depending on a current flowing in itself. Thus, since the organic EL elements are the self-luminous type display elements, the organic EL display devices can be easily thinned, reduced in power consumption, increased in luminance, and the like, as compared with liquid crystal display devices requiring backlights, color filters, and the like.

An active matrix type organic EL display device is formed with a plurality of pixel circuits arranged in a matrix shape. Each pixel circuit includes a drive transistor that controls supplying a current to an organic EL element. A Thin Film Transistor (TFT) is typically used as the drive transistor. However, as for the thin film transistor, a threshold voltage changes due to degradation. A display portion of the organic EL display device is provided with a large number of drive transistors, and since the deterioration degree is different for each drive transistor, variations in threshold voltage occur. As a result, variations in luminance occur, and display quality is degraded. Furthermore, with regard to the organic EL element, current efficiency decreases over time. In other words, the luminance gradually decreases over time, even in a case where a constant current is supplied to the organic EL element. As a result, image sticking occurs. As described above, in the active matrix type organic EL display device, processing for compensating for deterioration of the drive transistors or deterioration of the organic EL elements is performed in the related art.

An external compensation method is known as one of methods of compensation processing. According to the external compensation method, a current flowing through each of the drive transistors or organic EL elements under predetermined conditions is measured by a circuit provided outside the pixel circuits. Then, an input image signal is corrected based on the measurement result. As a result, deterioration of the drive transistors and deterioration of the organic EL elements are compensated.

Note that, in the following, a series of processes in which a current flowing in each of the pixel circuits is measured outside the pixel circuits, in order to compensate for the deterioration of the drive transistors or organic EL elements (display elements), is referred to as "monitoring processing", and a period in which the monitoring processing is performed is referred to as a "monitoring period". In addition, a row that is a target of the monitoring processing during a unit period such as one frame period is referred to as a "monitoring row", and a row other than the monitoring row is referred to as a "non-monitoring row". Furthermore, characteristics of the drive transistor provided in the pixel circuit is referred to as "TFT characteristics", and characteristics of the organic EL element provided in the pixel circuit is referred to as "OLED characteristics". Additionally, charging a holding capacitor (capacitor) in the pixel circuit by applying a desired potential (voltage) to a data signal line is referred to as "writing", and writing to a plurality of pixel circuits included in an i-th row (i is an integer) is simply referred to as "writing to the i-th row".

Note that an invention related to an organic EL display device adopting the external compensation method is disclosed in WO 2015/190407, for example. The active matrix type organic EL display device includes a gate driver (scanning signal line drive circuit) configured to drive a plurality of scanning signal lines disposed in the display portion, and the gate driver is configured of a shift register including a plurality of stages (a plurality of unit circuits) corresponding to a plurality of scanning signal lines in a one-to-one manner. FIG. 31 is a circuit diagram illustrating a configuration of a unit circuit in a known organic EL display device to which the external compensation method is adopted. With regard to the configuration illustrated in FIG. 31, for example, an output signal Q1 output from an output terminal 57 is provided to another unit circuit, and is provided to a scanning signal line as a scanning signal, and an output signal Q2 output from an output terminal 58 is provided to a monitoring control line disposed in a display portion as a monitoring control signal for controlling whether monitoring processing can be performed or not. Additionally, the unit circuit includes a transistor T13 related to controlling the output signal Q1 and a transistor T16 related to controlling the output signal Q2, and is provided with a transistor T15 between a first internal node N1 connected to a control terminal of the transistor T13 and a second internal node N2 connected to a control terminal of the transistor T16. A high level potential VDD that is a fixed potential is applied to a control terminal of the transistor T15 (see a portion denoted by a reference sign 9 in FIG. 31). This maintains the transistor T15 in an on state except when a potential of the second internal node N2 is higher than a normal high level. Note that, hereinafter, a transistor that controls the output of the output signal according to the potential of the control terminal, such as the transistor T13 and the transistor T16, is referred to as a "buffer transistor".

FIG. 32 is a signal waveform diagram for describing an operation of the unit circuit at the i-th stage when writing to the i-th row (writing for image display) is performed. When a set signal S is at a high level in a period P900, a capacitor C11 is charged to increase the potential of the first internal node N1. At this time, since the transistor T15 is in the on state, a capacitor C12 is also charged to increase the potential of the second internal node N2. In a period P901, a first clock CKA changes from a low level to a high level. This causes the first internal node N1 to be in a boost state due to the presence of the capacitor C11, and the potential of the output signal Q1 is sufficiently increased. As a result, writing for the image display is performed by the pixel circuits in the i-th row. Note that, since an enable signal EN is maintained at a low level in the period P901, the output signal Q2 is maintained at a low level. In a period P902, a reset signal R is set to a high level. As a result, the transistor T12 is turned on, and the potential of the first internal node N1 and the potential of the second internal node N2 are set to a low level.

FIG. 33 is a signal waveform diagram for describing an operation of the unit circuit at the i-th stage when the monitoring processing is performed. Note that the i-th row is assumed to be a monitoring row. When the set signal S is at the high level in the period P910, similar to the above-described period P900, the potential of the first internal node N1 and the potential of the second internal node N2 increase. In the period P911, the first clock CKA changes from the low level to the high level. As a result, similar to the above-described period P900, the potential of the output signal Q1 is sufficiently increased. Further, in the period P911, the enable signal EN also changes from the low level to the high level. This causes the second internal node N2 to be in a boost state due to the presence of the capacitor C12, and the potential of the output signal Q2 is sufficiently increased. As described above, in the period P911, the monitoring processing is performed for the pixel circuit in the i-th row. In the period P912, the reset signal R is set to a high level. As a result, similar to the above-described period P902, the potential of the first internal node N1 and the potential of the second internal node N2 are set to the low level.

In a known organic EL display device, the writing for image display or the monitoring processing is performed as described above, and deterioration of the drive transistor and deterioration of the organic EL element are compensated by correcting an input image signal based on the result of the monitoring processing.

CITATION LIST

Patent Literature

PTL 1: WO 2015/190407 brochure

SUMMARY

Technical Problem

However, according to the known unit circuit illustrated in FIG. 31, since the control terminal of the transistor T15 is always applied with a high level potential VDD, the potential of the second internal node N2 in the unit circuit at the i-th stage is at the high level, for example, even when writing for normal image display is performed in the i-th row (see the periods P900 and P901 in FIG. 32). This applies a positive voltage (such a positive voltage is referred to hereinafter as “stress”) between the control terminal of the transistor T16 and a second conduction terminal (a terminal connected to the output terminal 58). Thus, the stress is applied to the transistor T16 even in a period in which the output signal Q2 is not required to be at the high level. When stress is applied to a transistor, the transistor degrades. Due to this, in the example in the related art, a size of the transistor T16 needs to be increased in consideration of the application of the stress, and according to this, a frame size is increased. However, as for display devices such as organic EL display devices, a demand for miniaturization increases.

Thus, the following disclosure relates to a display device having an external compensation function, and an object thereof is to reduce a frame size, compared to the known display devices.

Solution to Problem

A display device according to some embodiments of the present disclosure includes a pixel circuit including a display element configured to be driven by a current and a drive transistor configured to control a drive current of the display element and has a function of performing monitoring processing being a series of processes of measuring a current flowing in the pixel circuit outside the pixel circuit to compensate for deterioration of the drive transistor or the display element, the display device including

- a display portion including a pixel matrix including n rows and m columns, the pixel matrix including n×m number of the pixel circuits, where each of n and m is an integer being equal to or larger than two, a scanning signal line provided corresponding to each of the rows of the pixel matrix, and a data signal line provided corresponding to each of the columns of the pixel matrix,
- a data signal line drive circuit configured to apply a data signal to the data signal line,
- a scanning signal line drive circuit configured to apply a scanning signal to the scanning signal line, and
- a first control signal line.

The scanning signal line drive circuit is configured of a shift register including a plurality of unit circuits each connected to the corresponding scanning signal line, each of the plurality of unit circuits includes

- a first output control circuit including a first internal node, a first output terminal connected to another unit circuit, and a first output control transistor including a control terminal connected to the first internal node, a first conduction terminal, and a second conduction terminal connected to the first output terminal,
- a second output control circuit including a second internal node, a second output terminal configured to output an on level signal for at least a part of a monitoring period for which the monitoring processing is performed, and a second output control transistor including a control terminal connected to the second internal node, a first conduction terminal, and a second conduction terminal connected to the second output terminal, and
- a first output circuit control transistor including a control terminal connected to the first control signal line, a first conduction terminal connected to the first internal node, and a second conduction terminal connected to the second internal node,
- a potential to be applied to the first control signal line is switched between a first potential for causing the first output circuit control transistor to be in an on state and a second potential for causing the first output circuit control transistor to be in an off state, and
- the first potential is applied to the first control signal line throughout the monitoring period.

A driving method (of a display device) according to some embodiments of the present disclosure is a driving method of a display device including a pixel circuit including a display element configured to be driven by a current and a drive transistor configured to control a drive current of the display element, the display device including

- a display portion including a pixel matrix including n rows and m columns, the pixel matrix including n×m number of the pixel circuits, where each of n and m is an integer being equal to or larger than two, a scanning signal line provided corresponding to each of the rows of the pixel matrix, and a data signal line provided corresponding to each of the columns of the pixel matrix,
- a data signal line drive circuit configured to apply a data signal to the data signal line,
- a scanning signal line drive circuit configured to apply a scanning signal to the scanning signal line, and
- a first control signal line, the driving method including

- a scanning step of performing scanning of the scanning signal line to write a data signal for image display applied to the data signal line to each of the pixel circuits by the data signal line drive circuit, and a monitoring step of performing monitoring processing being a series of processes of measuring a current flowing in the pixel circuit outside the pixel circuit to compensate for deterioration of the drive transistor or the display element.

The scanning signal line drive circuit is configured of a shift register including a plurality of unit circuits each connected to the corresponding scanning signal line, each of the plurality of unit circuits includes a first output control circuit including a first internal node, a first output terminal connected to another unit circuit, and a first output control transistor including a control terminal connected to the first internal node, a first conduction terminal, and a second conduction terminal connected to the first output terminal, a second output control circuit including a second internal node, a second output terminal configured to output an on level signal for at least a part of a monitoring period for which the monitoring processing is performed, and a second output control transistor including a control terminal connected to the second internal node, a first conduction terminal, and a second conduction terminal connected to the second output terminal, and a first output circuit control transistor including a control terminal connected to the first control signal line, a first conduction terminal connected to the first internal node, and a second conduction terminal connected to the second internal node, a potential to be applied to the first control signal line is switched between a first potential for causing the first output circuit control transistor to be in an on state and a second potential for causing the first output circuit control transistor to be in an off state, and in the monitoring step, the first potential is applied to the first control signal line.

Advantageous Effects of Disclosure

According to some embodiments of the present disclosure, the unit circuit configuring the scanning signal line drive circuit of the display device having the external compensation function includes the first output control transistor including the control terminal connected to the first internal node, the second output control transistor including the second conduction terminal connected to the second output terminal configured to output the on level signal for at least the part of the monitoring period, and the control terminal connected to the second internal node, and the first output circuit control transistor provided between the first internal node and the second internal node. Here, the control terminal of the first output circuit control transistor is provided with the first potential for causing the first output circuit control transistor to be in the on state and the second potential for causing the first output circuit control transistor to be in the off state. That is, the first output circuit control transistor is not always maintained in the on state. Thus, stress to be applied to the second output control transistor functioning as a buffer transistor is suppressed. As a result, a size of the second output control transistor can be reduced. According to the above, a frame size of the display device having the external compensation function can be made smaller than those of the known display devices.

DESCRIPTION OF EMBODIMENTS

Embodiments will be described below with reference to the accompanying drawings. Note that it is assumed that each of m and n is an integer equal to or larger than 2, i is an odd number equal to or larger than 3, and equal to or smaller than (n−2), and j is an integer equal to or larger than 1, and equal to or smaller than m.

1. First Embodiment

1.1 Overall Configuration

Figure 2:
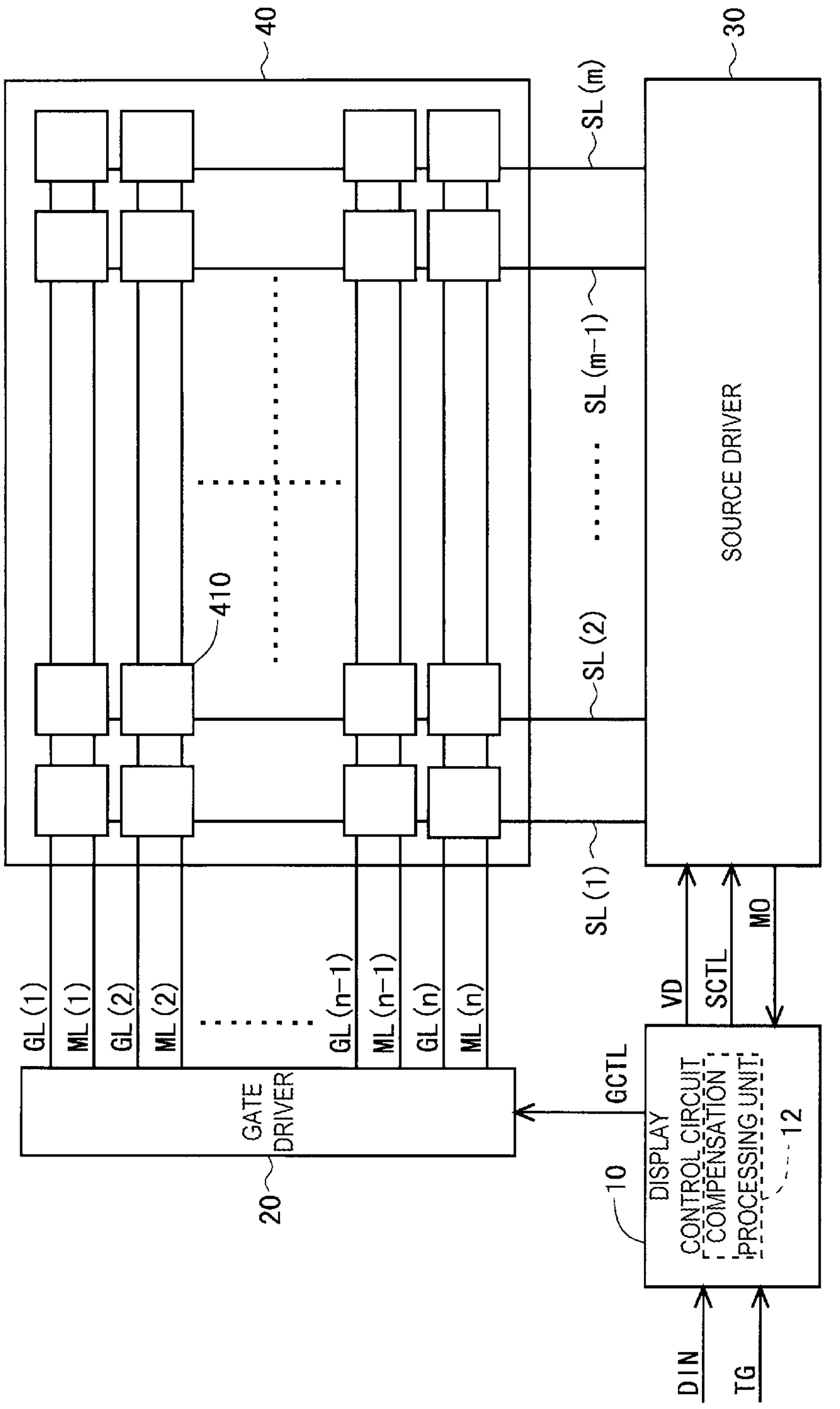
FIG. 2 is a block diagram illustrating an overall configuration of an organic EL display device according to the first embodiment described above.

FIG. 2 is a block diagram illustrating an overall configuration of an active-matrix type organic EL display device according to a first embodiment. The organic EL display device includes a display control circuit 10, a gate driver (scanning signal line drive circuit) 20, a source driver (data signal line drive circuit) 30, and a display portion 40. The display control circuit 10 includes a compensation processing unit 12 configured to compensate for deterioration of drive transistors and organic EL elements. In other words, the organic EL display device according to the present embodiment has an external compensation function. The gate driver 20 and the display portion 40 are integrally formed on a substrate configuring the display portion 40. That is, the gate driver 20 is formed to be monolithic.

In the display portion 40, m data signal lines SL(1) to SL(m) and n scanning signal lines GL(1) to GL(n) orthogonal to these data signal lines are arranged. Further, in the display portion 40, n monitoring control lines ML(1) to ML(n) are disposed so as to correspond one-to-one to the n scanning signal lines GL(1) to GL(n). The scanning signal lines GL(1) to GL(n) and the monitoring control lines ML(1) to ML(n) are typically parallel to each other. Furthermore, the display portion 40 is provided with (n×m) pixel circuits 410 corresponding to intersecting portions between the data signal lines SL(1) to SL(m) and the scanning signal lines GL(1) to GL(n). As a result, a pixel matrix of n rows and m columns is formed in the display portion 40. In the display portion 40, power source lines (not illustrated) that are common to the respective pixel circuits 410 are also disposed. To be more specific, a power source line that supplies a high-level power supply voltage ELVDD for driving the organic EL element (hereinafter, referred to as a “high-level power source line”), and a power source line that supplies a low-level power supply voltage ELVSS for driving the organic EL element (hereinafter, referred to as a “low-level power source line”) are disposed. The high-level power supply voltage ELVDD, and the low-level power supply voltage ELVSS are supplied from a power source circuit (not illustrated).

Note that, in the following description, when necessary, scanning signals given to the scanning signal lines GL(1) to GL(n) are also denoted by reference signs GL(1) to GL(n), respectively, monitoring control signals given to monitoring control lines ML(1) to ML(n) are also denoted by reference signs ML(1) to ML(n), respectively, and data signals given to data signal lines SL(1) to SL(m) are also denoted by reference signs SL(1) to SL(m), respectively.

The display control circuit 10 receives an input image signal DIN and a group of timing signals (such as a horizontal synchronization signal and a vertical synchronization signal) TG that are transmitted from the outside, and outputs a digital video signal VD, a source control signal SCTL for controlling an operation of the source driver 30, and a gate control signal GCTL for controlling an operation of the gate driver 20. The source control signal SCTL includes a source start pulse signal, a source clock signal, a latch strobe signal, and the like. The gate control signal GCTL includes a gate start pulse signal, a gate clock signal, an enable signal, and the like. Note that the digital video signal VD for image display is generated by the compensation processing unit 12 performing compensation calculation processing on the input image signal DIN in accordance with monitoring data (data measured to obtain TFT characteristics and OLED characteristics) MO provided from the source driver 30.

The gate driver 20 is connected to the scanning signal lines GL(1) to GL(n) and the monitoring control lines ML(1) to ML(n). As will be described later, the gate driver 20 is configured of a shift register including a plurality of unit circuits. The gate driver 20 applies scanning signals to the scanning signal lines GL(1) to GL(n), and applies monitoring control signals to the monitoring control lines ML(1) to ML(n), based on the gate control signal GCTL output from the display control circuit 10.

Figure 3:
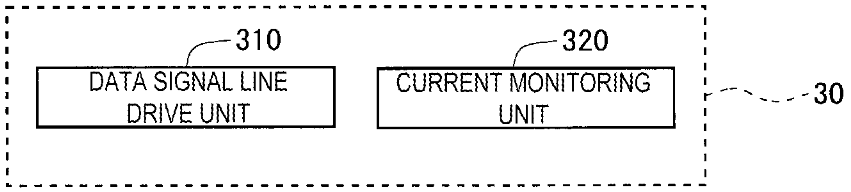
FIG. 3 is a diagram for describing a function of a source driver according to the first embodiment described above.

The source driver 30 is connected to the data signal lines SL(1) to SL(m). The source driver 30 selectively performs an operation of driving the data signal lines SL(1) to SL(m) and an operation of measuring a current flowing in each of the data signal lines SL(l) to SL(m). Specifically, as illustrated in FIG. 3, the source driver 30 functionally includes a portion configured to function as the data signal line drive unit 310 configured to drive the data signal lines SL(1) to SL(m) and a portion configured to function as a current monitoring unit 320 configured to measure currents output from the pixel circuits 410 to the data signal lines SL(1) to SL(m). The current monitoring unit 320 measures the currents flowing in the data signal lines SL(1) to SL(m), and outputs monitoring data MO based on the measured values. As described above, in the present embodiment, the data signal lines SL(1) to SL(m) are used not only for transmission of data signals for image display, but also as signal lines configured to cause currents corresponding to the characteristics of the drive transistors or the organic EL elements to flow during the monitoring processing. Note that a driving method called "DEMUX" can be employed in which an output (that is, a data signal) from the source driver 30 is shared with the plurality of data signal lines SL.

As described above, by applying scanning signals to the scanning signal lines GL(1) to GL(n), applying monitoring control signals to the monitoring control lines ML(1) to ML(n), and applying data signals serving as luminance signals to the data signal lines SL(1) to SL(m), an image based on the input image signal DIN is displayed on the display portion 40. In addition, since the monitoring processing is performed and the input image signal DIN is subjected to the compensation calculation processing in accordance with the monitoring data MO, the deterioration of the drive transistors or the organic EL elements is compensated.

1.2 Pixel Circuit and Source Driver

Next, the pixel circuits 410 and the source driver 30 will be described in detail. When the source driver 30 functions as the data signal line drive unit 310, the source driver 30 performs the following operations. The source driver 30 receives the source control signal SCTL output from the display control circuit 10, and applies voltages corresponding one-to-one to target luminance to m data signal lines SL(1) to SL(m) as data signals. At this time, the source driver 30 sequentially holds the digital video signals VD indicating respective voltages to be applied to the corresponding data signal lines SL at timings when pulses of source clock signals are generated with a pulse of a source start pulse signal being as a trigger. Then, at a timing when a pulse of a latch strobe signal is generated, the held digital video signals VD are converted into analog voltages. The converted analog voltages are simultaneously applied, as data signals, to all of the data signal lines SL(1) to SL(m). When the source driver 30 functions as the current monitoring unit 320, the source driver 30 applies appropriate voltages for monitoring processing as data signals to the data signal lines SL(1) to SL(m), and thereby converts respective currents flowing in the data signal lines SL(1) to SL(m) to voltages. The converted data is output from the source driver 30 as the monitoring data MO.

Figure 4:
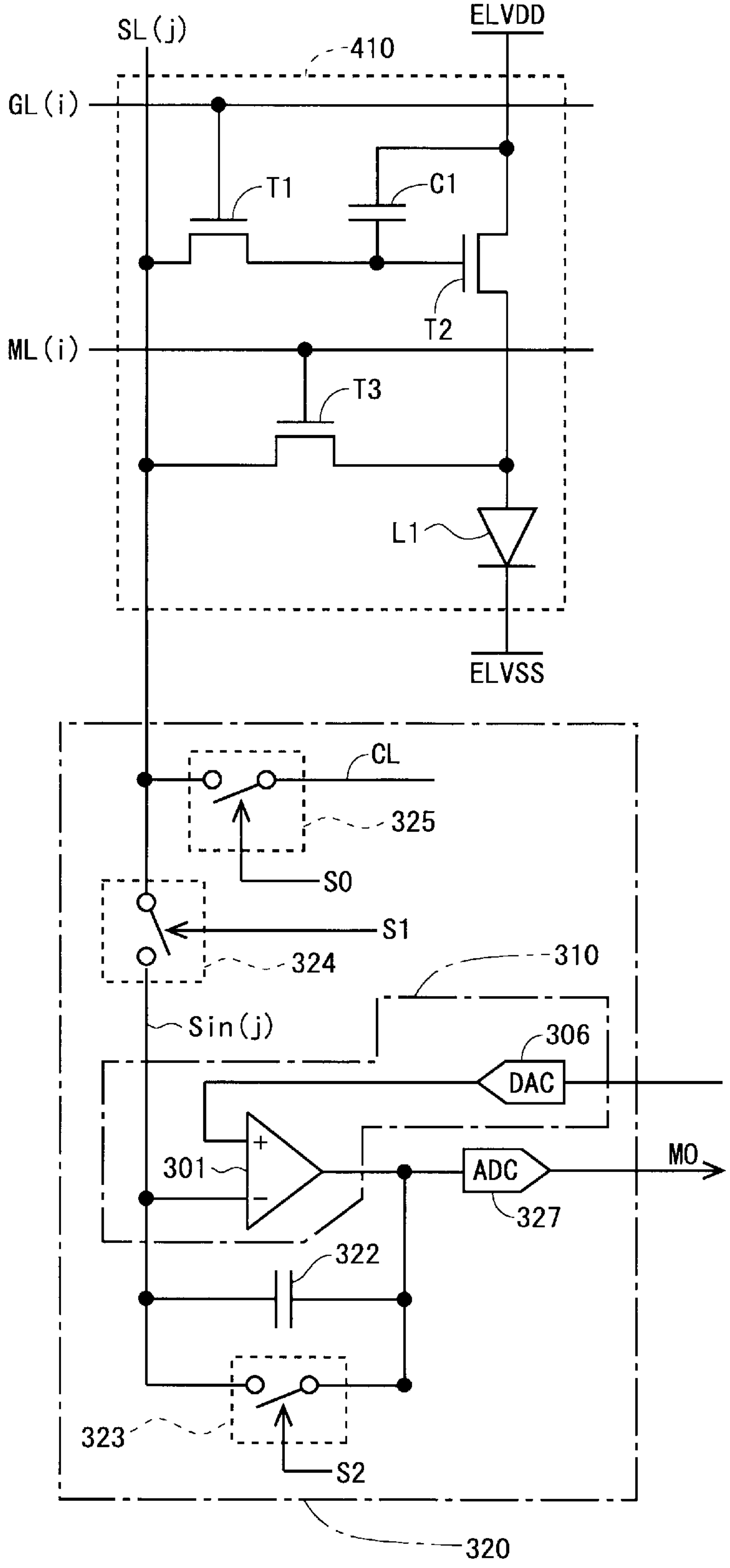
FIG. 4 is a circuit diagram illustrating a pixel circuit and a part of a source driver according to the first embodiment described above.

FIG. 4 is a circuit diagram illustrating the pixel circuit 410 and a part of the source driver 30. Note that in FIG. 4, the pixel circuit 410 at the i-th row and j-th column and a portion corresponding to the data signal line SL(j) at the j-th column of the source driver 30 are illustrated. The pixel circuit 410 includes one organic EL element L1, three transistors T1 to T3 (a writing control transistor T1 configured to control writing to the capacitor C1, a drive transistor T2 configured to control supply of a current to the organic EL element L1, and a monitoring control transistor T3 configured to control whether or not the TFT characteristics or the OLED characteristics are detected), and one capacitor (capacitive element) C1. In the present embodiment, the transistors T1 to T3 are n-channel type thin film transistors. Note that, as the transistors T1 to T3, an oxide TFT (a thin film transistor using an oxide semiconductor for a channel layer) and an amorphous silicon TFT can be employed. Examples of oxide TFTs include TFTs containing indium gallium zinc oxide (InGaZnO). By employing the oxide TFT, for example, it is possible to achieve high definition and low power consumption.

As for the writing control transistor T1, a control terminal is connected to the scanning signal line GL(i), a first conduction terminal is connected to the data signal line SL(j), and a second conduction terminal is connected to a control terminal of the drive transistor T2 and one end of the capacitor C1. As for the drive transistor T2, a control terminal is connected to the second conduction terminal of the writing control transistor T1 and the one end of the capacitor C1, a first conduction terminal is connected to the other end of the capacitor C1 and a high-level power source line, and a second conduction terminal is connected to a first conduction terminal of the monitoring control transistor T3 and an anode terminal of the organic EL element L1. As for the monitoring control transistor T3, a control terminal is connected to the monitoring control line ML(i), a first conduction terminal is connected to the second conduction terminal of the drive transistor T2 and the anode terminal of the organic EL element L1, and a second conduction terminal is connected to the data signal line SL(j). As for the capacitor C1, the one end is connected to the second conduction terminal of the writing control transistor T1 and the control terminal of the drive transistor T2, and the other end is connected to the first conduction terminal of the drive transistor T2 and the high-level power source line. As for the organic EL element L1, an anode terminal is connected to the second conduction terminal of the drive transistor T2 and the first conduction terminal of the monitoring control transistor T3, a cathode terminal is connected to a low-level power source line. In the present embodiment, the organic EL element L1 corresponds to a display element, the anode terminal of the organic EL element L1 corresponds to a first terminal, and the cathode terminal of the organic EL element L1 corresponds to a second terminal.

Next, a portion of the source driver 30 functioning as the current monitoring unit 320 will be described. As illustrated in FIG. 4, the current monitoring unit 320 is configured of a D/A converter 306, an A/D converter 327, an operational amplifier 301, a capacitor 322, and three switches (switches 323, 324, and 325). Note that the operational amplifier 301 and the D/A converter 306 also function as constitutional elements of the data signal line drive unit 310. The current monitoring unit 320 is provided with control signals S0, S1, and S2 for controlling states of the three switches as the source control signal SCTL. An internal data line Sin(j) of the current monitoring unit 320 is connected to the data signal line SL(j) via the switch 324. As for the operational amplifier 301, an inverting input terminal is connected to the internal data line Sin(j), and a non-inverting input terminal is provided with an output from the D/A converter 306. The capacitor 322 and the switch 323 are provided between an output terminal of the operational amplifier 301 and the internal data line Sin(j). A control signal S2 is provided to the switch 323. The operational amplifier 301, the capacitor 322, and the switch 323 configure an integrator circuit. An operation of the integrator circuit will now be described. When the switch 323 is in the on state, a short circuit between the output terminal and the inverting input terminal of the operational amplifier 301 (that is, between two electrodes of the capacitor 322) occurs. At this time, no charge is accumulated in the capacitor 322, and potentials of the output terminal of the operational amplifier 301 and the internal data line Sin(j) are equal to an output potential from the D/A converter 306. When the switch 323 is switched from the on state to the off state, charging is performed to the capacitor 322 based on a current flowing through the internal data line Sin(j). That is, a time integral value of the current flowing through the internal data line Sin(j) is accumulated in the capacitor 322. As a result, the potential of the output terminal of the operational amplifier 301 changes depending on a magnitude of the current flowing through the internal data line Sin(j). An output from the operational amplifier 301 is converted to a digital signal by the A/D converter 327, and the digital signal is sent to the display control circuit 10 as the monitoring data MO.

The switch 324 is provided between the data signal line SL(j) and the internal data line Sin(j). A control signal S1 is provided to the switch 324. By switching the state of the switch 324 based on the control signal S1, an electrical connection state between the data signal line SL(j) and the internal data line Sin( ) is controlled. In the present embodiment, when the control signal S1 is at the high level, the data signal line SL(j) and the internal data line Sin(j) are in an electrically connected state, and when the control signal S1 is at the low level, the data signal line SL(j) and the internal data line Sin(j) are in an electrically disconnected state.

The switch 325 is provided between the data signal line SL(j) and the control line CL. A control signal S0 is provided to the switch 325. By switching the state of the switch 325 based on the control signal S0, an electrical connection state between the data signal line SL(j) and the control line CL is controlled. In the present embodiment, when the control signal S0 is at the high level, the data signal line SL(j) and the control line CL are electrically connected, and when the control signal S0 is at the low level, the data signal line SL(j) and the control line CL are electrically disconnected. When the data signal line SL(j) and the control line CL are electrically connected, the data signal line SL(j) becomes in a high impedance state.

As described above, when the switch 324 is turned off, the data signal line SL(j) and the internal data line Sin(j) are in an electrically disconnected state. At this time, when the switch 323 is in the off state, the potential of the internal data line Sin(j) is maintained. In the present embodiment, AD conversion is performed by the A/D converter 327 with the potential of the internal data line Sin(j) maintained in this manner.

1.3 Gate Driver

A detailed configuration of the gate driver 20 according to the present embodiment will be described. The gate driver 20 is configured of a shift register including a plurality of stages (a plurality of unit circuits: at least n unit circuits). The display portion 40 has a pixel matrix having n rows and m columns, and the respective stages (respective unit circuits) of the shift register are provided corresponding one-to-one to the respective rows of the pixel matrix.

Figure 5:
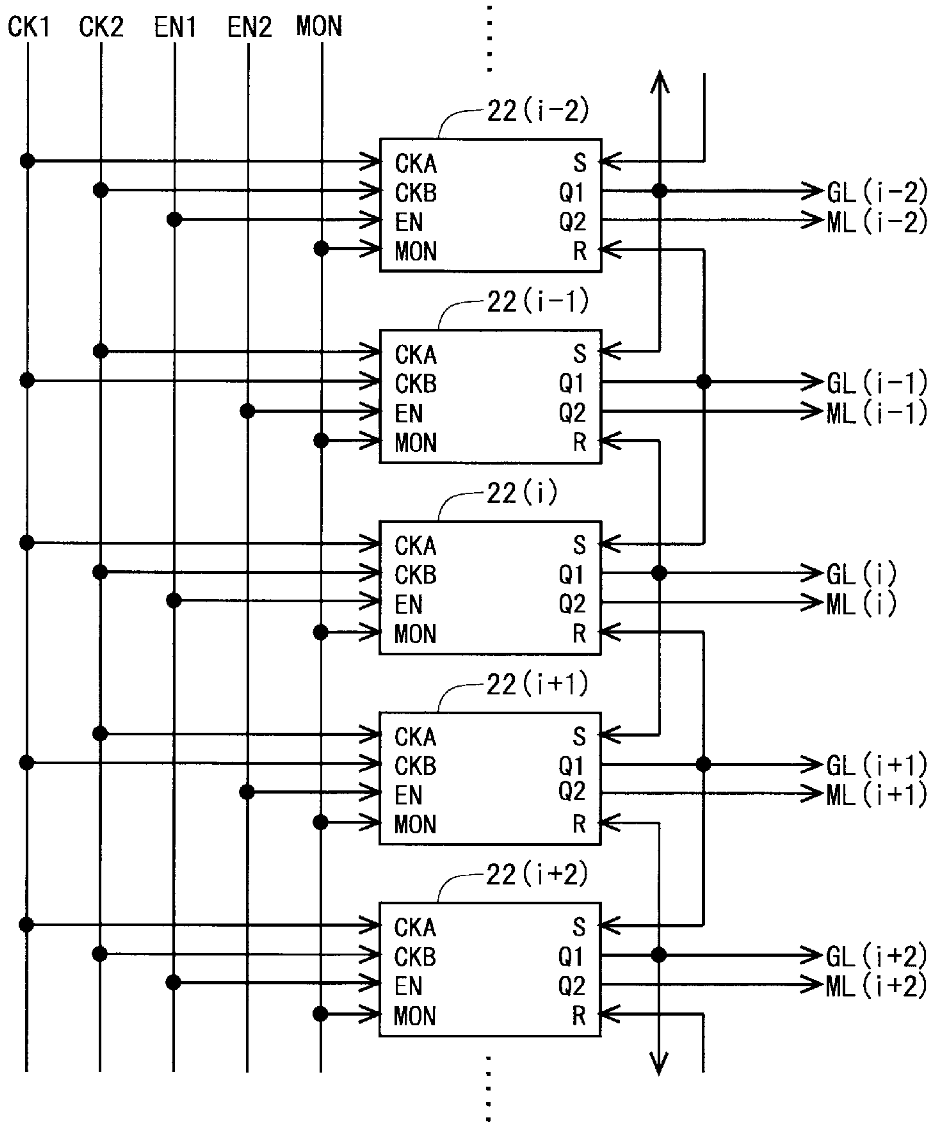
FIG. 5 is a block diagram illustrating a configuration of a shift register having five stages configuring the gate driver according to the first embodiment described above.

FIG. 5 is a block diagram illustrating a configuration of the shift register having five stages. Here, it is assumed that i is an odd number equal to or larger than 3 and equal to or smaller than (n−2), attention is focused on the unit circuits 22(*i*−2), 22(*i*−1), 22(*i*), 22(*i*+1), and 22(*i*+2) respectively provided at the (i−2)-th stage, the (i−1)-th stage, the i-th stage, the (i+1)-th stage, and the (i+2)-th stage. The shift register is applied with the gate start pulse signal, a clock signal CK1, a clock signal CK2, an enable signal EN1, an enable signal EN2, and a control signal MON as the gate control signal GCTL. Note that the gate start pulse signal is a signal to be provided to the unit circuit 22(1) at the first stage as the set signal S, and is omitted in FIG. 5.

Each unit circuit 22 includes input terminals configured to receive each of the first clock CKA, the second clock CKB, the enable signal EN, the control signal MON, the set signal S, and the reset signal R, and output terminals configured to output each of the output signal Q1 and the output signal Q2.

As for the unit circuit 22 at the odd-numbered stage, the clock signal CK1 is provided as the first clock CKA, the clock signal CK2 is provided as the second clock CKB, and the enable signal EN1 is provided as the enable signal EN. As for the unit circuit 22 at the even-numbered stage, the clock signal CK2 is provided as the first clock CKA, the clock signal CK1 is provided as the second clock CKB, and the enable signal EN2 is provided as the enable signal EN. The control signal MON is applied in common to all of the unit circuits 22. In addition, to the unit circuit 22 at each stage, the output signal Q1 from the unit circuit 22 at the previous stage is provided as the set signal S, and the output signal Q1 from the unit circuit 22 at the next stage is provided as the reset signal R. The output signal Q1 from the unit circuit 22 at each stage is provided as the reset signal R to the unit circuit 22 at the previous stage, is provided as the set signal S to the unit circuit 22 at the next stage, and is provided as a scanning signal to the corresponding scanning signal line GL. The output signal Q2 from the unit circuit 22 at each stage is provided as a monitoring control signal to the corresponding monitoring control line ML. Note that, as illustrated in FIG. 4, the scanning signal line GL is connected to the control terminal of the writing control transistor T1 in the pixel circuit 410, and the monitoring control line ML is connected to the control terminal of the monitoring control transistor T3 in the pixel circuit 410.

Figure 1:
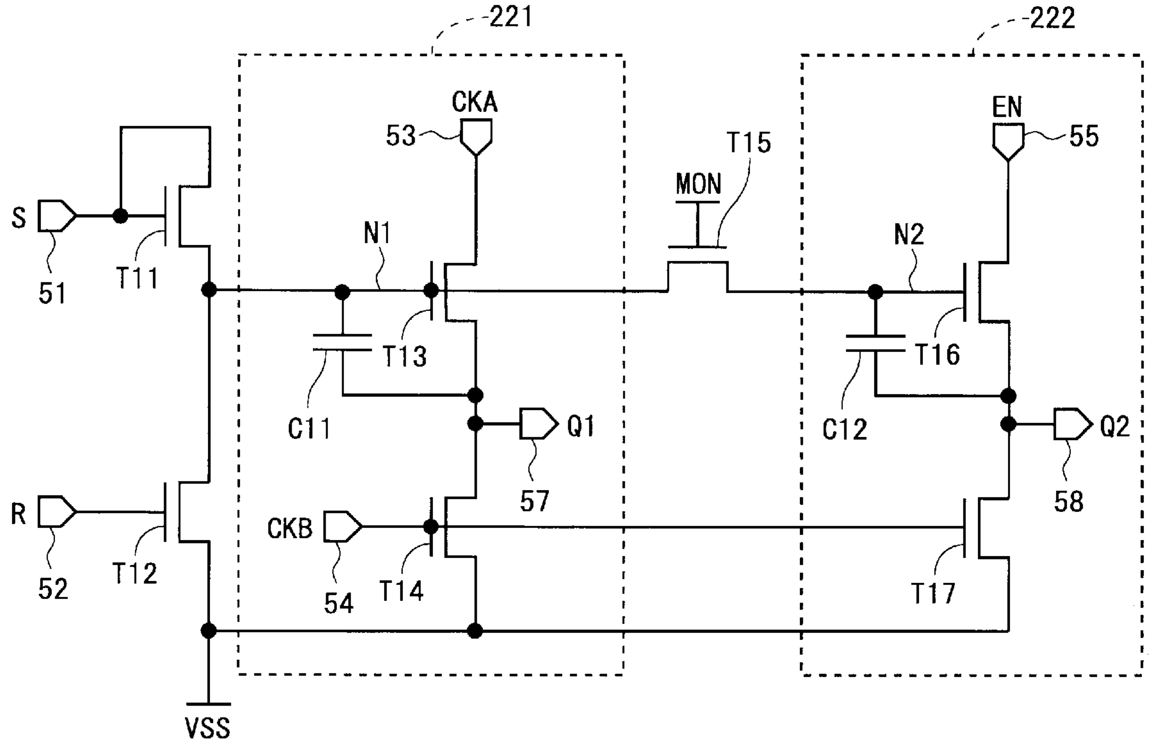
FIG. 1 is a circuit diagram illustrating a configuration of a unit circuit in a gate driver according to a first embodiment.

FIG. 1 is a circuit diagram illustrating a configuration of the unit circuit 22 according to the present embodiment. As illustrated in FIG. 1, the unit circuit 22 includes seven transistors T11 to T17 and two capacitors C11 and C12. In addition, the unit circuit 22 includes five input terminals 51 to 55 and two output terminals 57 and 58, in addition to the input terminal connected to the control signal line configured to transmit the control signal MON and the input terminal connected to a power source line applied with the low-level potential VSS (hereinafter, referred to as a "reference potential line"). In FIG. 1, the input terminal configured to receive the set signal S is denoted by a reference sign 51, the input terminal configured to receive the reset signal R is denoted by a reference sign 52, the input terminal configured to receive the first clock CKA is denoted by a reference sign 53, the input terminal configured to receive the second clock CKB is denoted by a reference sign 54, the input terminal configured to receive the enable signal EN is denoted by a reference sign 55, the output terminal configured to output the output signal Q1 is denoted by a reference sign 57, and the output terminal configured to output the output signal Q2 is denoted by a reference sign 58. Note that, as will be described later, the output signal Q2 at the high level (on level) is output from the output terminal 58 for some periods (periods P11 and P13 in FIG. 10) of the monitoring period for which the monitoring processing is performed.

A second conduction terminal of the transistor T11, a first conduction terminal of the transistor T12, a control terminal of the transistor T13, a first conduction terminal of the transistor T15, and one end of the capacitor C11 are connected to one another. Note that a region (wiring line) where they are connected to one another is referred to as a "first internal node". The first internal node is denoted by a reference sign N1. A second conduction terminal of the drive transistor T15, a control terminal of the transistor T16, and one end of the capacitor C12 are connected to one another. Note that a region (wiring line) where they are connected to one another is referred to as a "second internal node". The second internal node is denoted by a reference sign N2.

The unit circuit 22 includes a first output control circuit 221 that controls the output of the output signal Q1, and a second output control circuit 222 that controls the output of the output signal Q2. The first output control circuit 221 includes the first internal node N1, the transistor T13, the transistor T14, an input terminal 53, an input terminal 54, and an output terminal 57. The second output control circuit 222 includes the second internal node N2, the transistor T16, the transistor T17, an input terminal 55, and an output terminal 58.

As for the transistor T11, a control terminal and a first conduction terminal are connected to the input terminal 51 (in other words, in a diode connection state), and the second conduction terminal is connected to the first internal node N1. As for the transistor T12, a control terminal is connected to the input terminal 52, the first conduction terminal is connected to the first internal node N1, and a second conduction terminal is connected to the reference potential line. As for the transistor T13, the control terminal is connected to the first internal node N1, a first conduction terminal is connected to the input terminal 53, and a second conduction terminal is connected to the output terminal 57. As for the transistor T14, a control terminal is connected to the input terminal 54, a first conduction terminal is connected to the output terminal 57, and a second conduction terminal is connected to the reference potential line. As for the transistor T15, a control terminal is connected to the control signal line, the first conduction terminal is connected to the first internal node N1, and the second conduction terminal is connected to the second internal node N2. As for the transistor T16, the control terminal is connected to the second internal node N2, a first conduction terminal is connected to the input terminal 55, and a second conduction terminal is connected to the output terminal 58. As for the transistor T17, a control terminal is connected to the input terminal 54, a first conduction terminal is connected to the output terminal 58, and a second conduction terminal is connected to the reference potential line. As for the capacitor C11, the one end is connected to the first internal node N1, and the other end is connected to the output terminal 57. As for the capacitor C12, the one end is connected to the second internal node N2, and the other end is connected to the output terminal 58.

Attention is now directed toward the transistor T15. During a period when the control signal MON provided to the control signal line is at the high level, the transistor T15 is maintained in the on state except when the potential of the second internal node N2 is higher than the normal high level. The transistor T15 is turned off when the potential of the second internal node N2 is larger than or equal to a predetermined value, and electrically disconnects the first internal node N1 and the second internal node N2. Thus, the transistor T15 assists in increasing the potential of the second internal node N2 when the second internal node N2 is in a boost state.

In the present embodiment, a first output control transistor is achieved by the transistor T13, a first output circuit control transistor is achieved by the transistor T15, a second output control transistor is achieved by the transistor T16, a first output terminal is achieved by the output terminal 57, a second output terminal is achieved by the output terminal 58, and a first control signal line is achieved by the control signal line that transmits the control signal MON.

1.4 Driving Method

A driving method according to the present embodiment will be described. Note that, here, a period from the start of scanning of the scanning signal line GL(1) for image display to the next start of the scanning of the scanning signal line GL(1) is referred to as a "frame period".

1.4.1 Overview

In the present embodiment, a monitoring mode and a non-monitoring mode are prepared as an operation mode related to the monitoring processing. When the operation mode is set to the monitoring mode, the monitoring processing is performed at any time during an operation of the organic EL display device. In particular, the monitoring processing is performed for at least one row in each frame period. The monitoring processing is performed during a normal display period. The monitoring processing to be performed during the normal display period in this way is referred to as "real-time monitoring". When the operation mode is set to the non-monitoring mode, the monitoring processing is not performed during the operation of the organic EL display device. In other words, the display is performed based on the input image signal DIN in all rows throughout the period in which the organic EL display device is operating.

An operation in each mode will be described with reference to FIG. 6 and FIG. 7. Note that FIG. 6 and FIG. 7 schematically illustrate scanning sequentially from the scanning signal line GL(1) at the first row to the scanning signal line GL(n) at the n-th row in order for writing for image display by diagonal thick lines (the same applies to FIG. 17 to FIG. 19).

Figure 6:
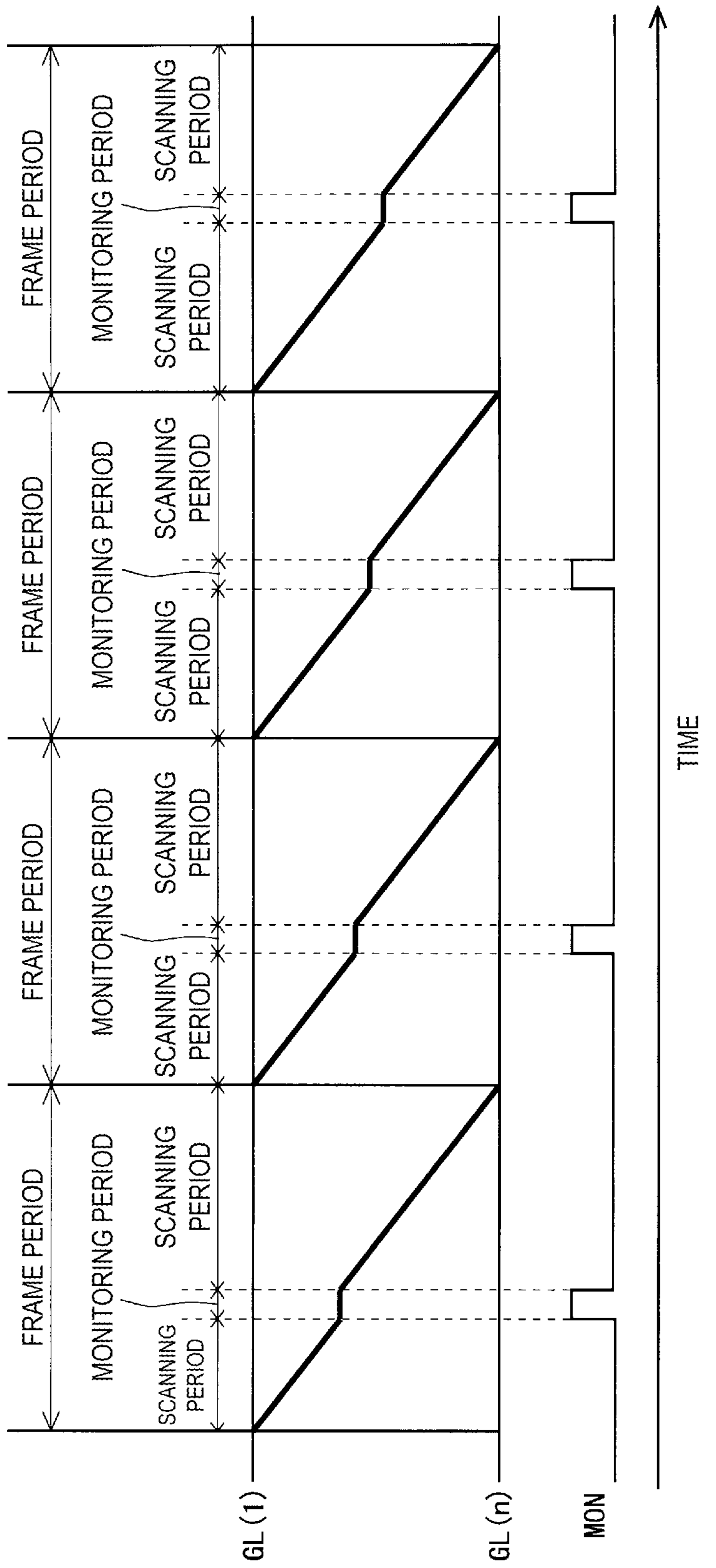
FIG. 6 is a diagram for describing a schematic operation when an operation mode is set to a monitoring mode in the first embodiment described above.

When the operation mode is set to the monitoring mode, the monitoring period is included in each frame period, as illustrated in FIG. 6. Regarding each frame period, periods other than the monitoring period are scanning periods. The scanning period is a period during which scanning of the scanning signal line GL is performed for image display. In this way, the above-described real-time monitoring is performed in the present embodiment. The control signal MON is maintained at the low level during the scanning period, and is at the high level only during the monitoring period (however, strictly, the control signal MON is at the high level in a period from slightly before the start of the monitoring period to slightly after the end of the monitoring period). As a result, the transistor T15 (see FIG. 1) in the unit circuit 22 is maintained in an off state in the scanning period, and is maintained in an on state in the monitoring period except for a part of the monitoring period (a period in which the potential of the second internal node N2 is higher than the normal high level). Note that the potential of the control signal MON at the high level corresponds to the first potential, and the potential of the control signal MON at the low level corresponds to the second potential.

Figure 7:
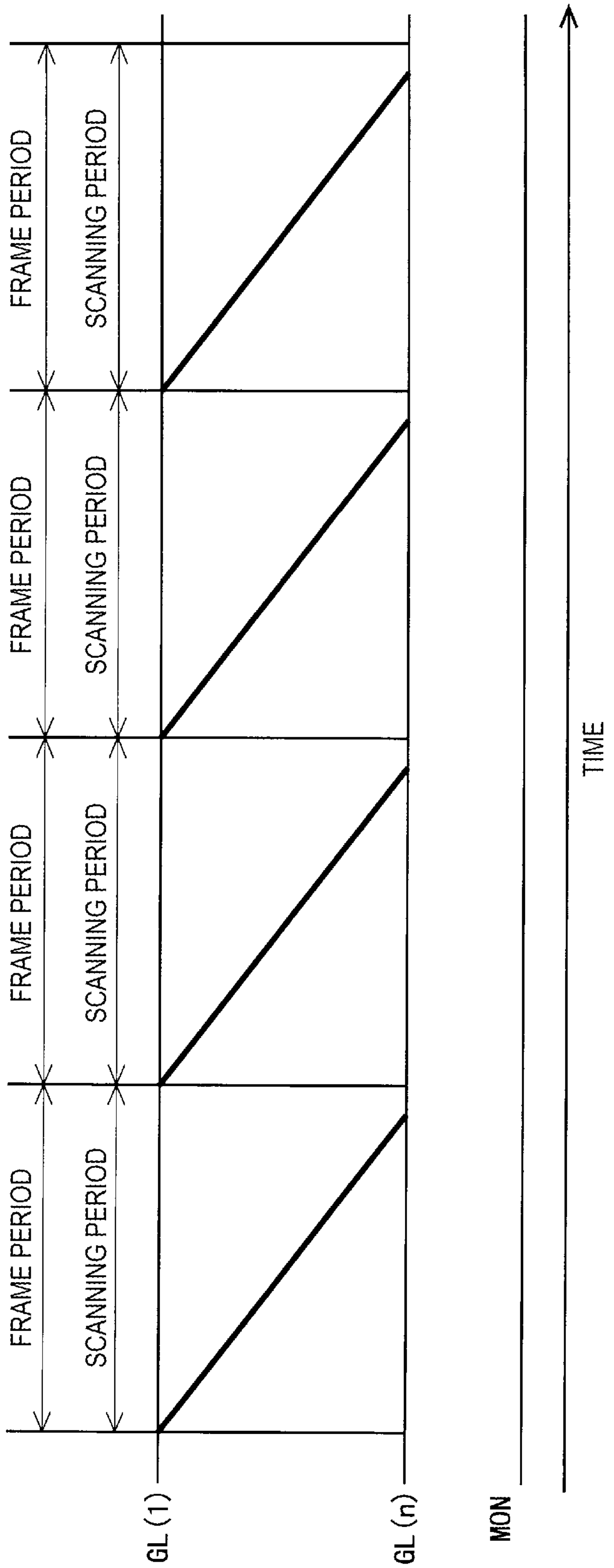
FIG. 7 is a diagram for describing a schematic operation when the operation mode is set to a non-monitoring mode in the first embodiment described above.

When the operation mode is set to the non-monitoring mode, unlike when the operation mode is set to the monitoring mode, only the scanning period is included in each frame period as illustrated in FIG. 7. In other words, operations for writing are continuously performed without performing the monitoring processing. The control signal MON is maintained at the low level. Thus, the transistor T15 in the unit circuit 22 is maintained in the off state throughout the period in which the operation mode is set to the non-monitoring mode.

When the operation mode is set to the monitoring mode, a vertical period (a period from the start of scanning of the scanning signal line GL(1) at the first row to the end of scanning of the scanning signal line GL(n) at the n-th row) is longer than that when the operation mode is set to the non-monitoring mode. In other words, the vertical period of the image display including the monitoring processing is longer than the vertical period of the image display not including the monitoring processing.

Note that in the present embodiment, a scanning step is achieved by the operation in the scanning period, and a monitoring step is achieved by the operation of the monitoring period.

1.4.2 Operation when Operation Mode is Set to Non-Monitoring Mode

Figure 8:
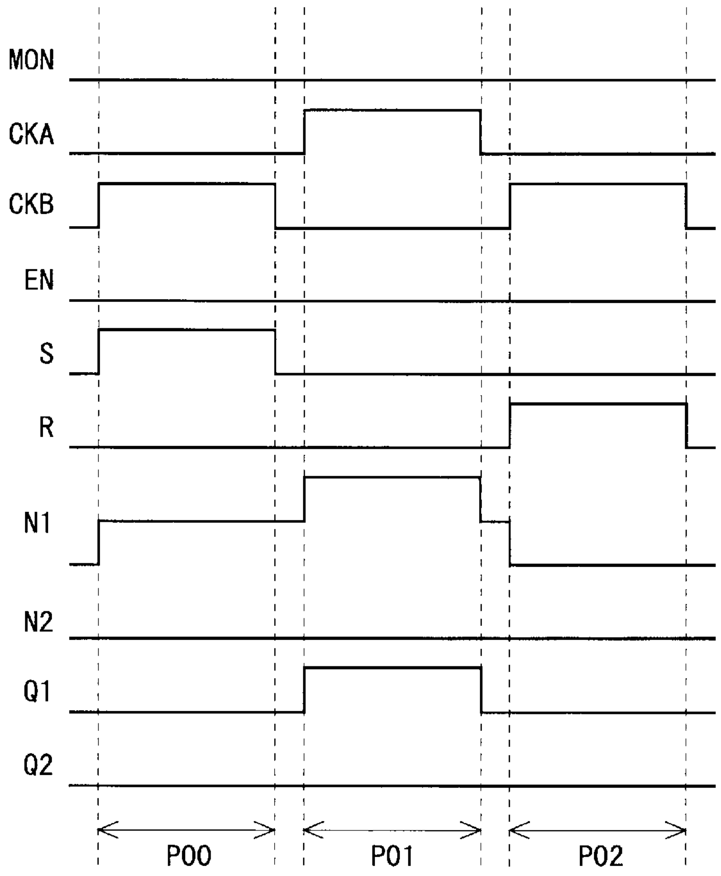
FIG. 8 is a signal waveform diagram for describing an operation of a unit circuit when the operation mode is set to the non-monitoring mode in the first embodiment described above.

With reference to FIG. 8, an operation of the unit circuit 22(*i*) at the i-th stage when the operation mode is set to the non-monitoring mode will be described. However, attention is focused on an operation when writing to the i-th row is performed. Immediately before the start of a period P00, the potential of the first internal node N1 and the potential of the second internal node N2 are set to the low level.

When the period P00 starts, the set signal S changes from the low level to the high level. As illustrated in FIG. 1, since the transistor T11 is diode-connected, a pulse of the set signal S sets the transistor T11 to the on state, and the capacitor C11 is charged. This increases the potential of the first internal node N1 to set the transistor T13 to the on state. However, in the period P00, the first clock CKA is maintained at the low level, and thus, the output signal Q1 is maintained at the low level. Additionally, in the period P00, the control signal MON is maintained at the low level, and thus, the transistor T15 is maintained in the off state. Thus, the potential of second internal node N2 does not rise.

When the period P01 starts, the first clock CKA changes from the low level to the high level. At this time, since the transistor T13 is in the on state, the potential of the output terminal 57 (the potential of the output signal Q1) rises along with the rise of the potential of the input terminal 53. Here, since the capacitor C11 is provided between the first internal node N1 and the output terminal 57 as illustrated in FIG. 1, the potential of the first internal node N1 rises along with the rise of the potential of the output terminal 57 (the first internal node N1 is set to a boost state). As a result, a large voltage is applied to the control terminal of the transistor T13, and the potential of the output signal Q1 rises to a level sufficient to cause the writing control transistor T1 being a connection destination of the output terminal 57 to be turned on. Thus, the writing is performed in the pixel circuit 410 in the i-th row.

At the end of the period P01, the first clock CKA changes from the high level to the low level. As a result, the potential of the output terminal 57 (the potential of the output signal Q1) decreases as the potential of the input terminal 53 decreases. As the potential of the output terminal 57 decreases, the potential of the first internal node N1 also decreases via the capacitor C11.

When the period P02 starts, the reset signal R changes from the low level to the high level. Thus, the transistor T12 is set to the on state. As a result, the potential of the first internal node N1 changes to the low level.

1.4.3 Operation when Operation Mode is Set to Monitoring Mode

Figure 9:
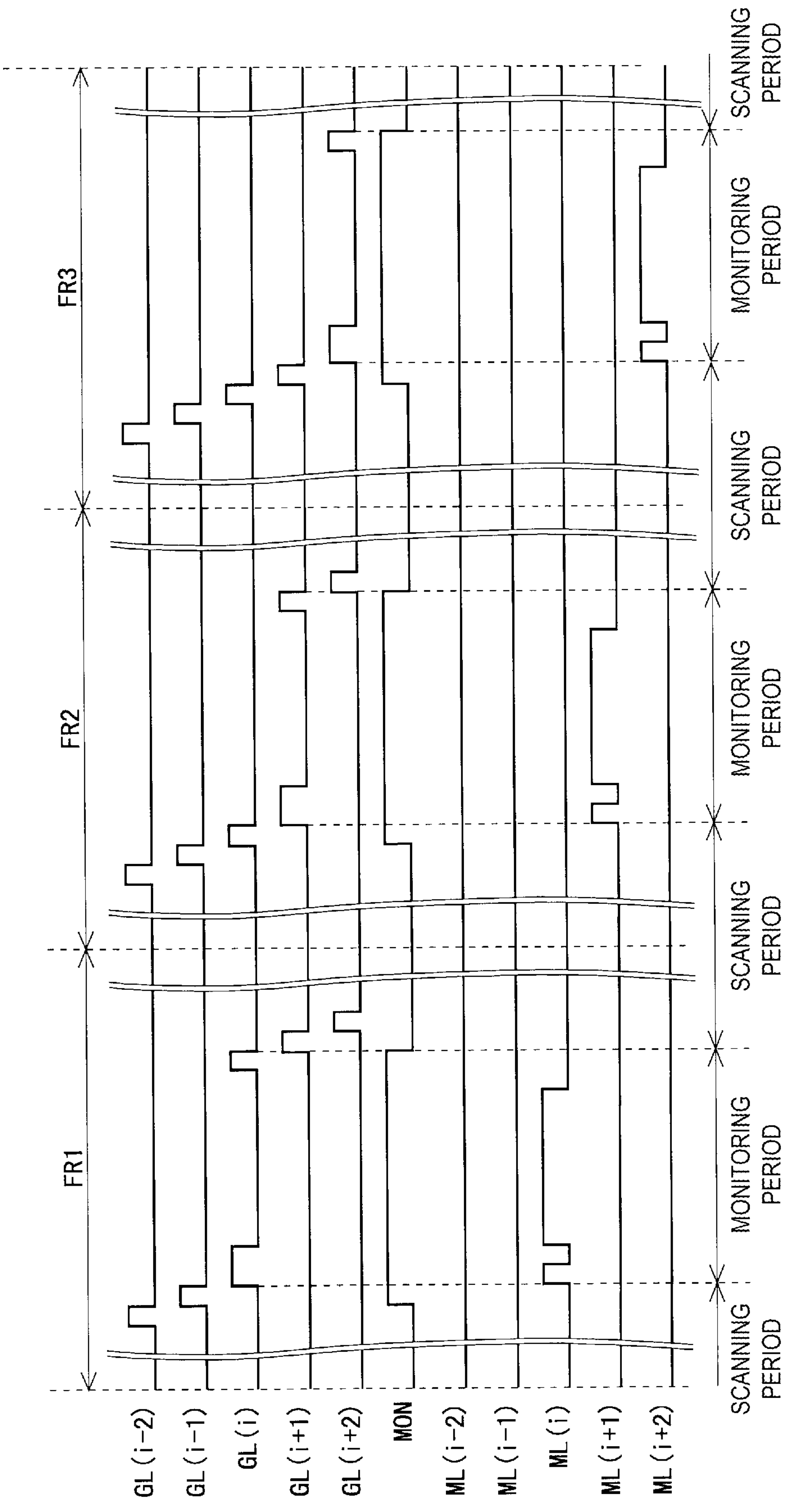
FIG. 9 is a signal waveform diagram for three consecutive frame periods when the operation mode is set to the monitoring mode in the first embodiment described above.

FIG. 9 is a signal waveform diagram of successive three frame periods FR1 to FR3 when the operation mode is set to the monitoring mode. The monitoring processing for the i-th row is performed in the frame period FR1, the monitoring processing for the (i+1)-th row is performed in the frame period FR2, and the monitoring processing for the (i+2)-th row is performed in the frame period FR3. As described above, in the present embodiment, the monitoring processing is performed for one row in each frame period. However, the monitoring processing may be performed for a plurality of rows in each frame period. As can be understood from FIG. 9, in each frame period, the scanning signal GL corresponding to the non-monitoring row is set to the high level only once, but the scanning signal GL corresponding to the monitoring row is set to the high level twice. In this manner, the scanning pulse is given twice to the scanning signal line GL corresponding to the monitoring row in each frame period. A period from the rise of the first scanning pulse to the decay of the second scanning pulse is the monitoring period. In the monitoring period, the control signal MON is maintained at the high level. In each frame period, the monitoring control signal ML corresponding to the non-monitoring row is maintained at the low level, but the monitoring control signal ML corresponding to the monitoring row is set to the high level twice in the monitoring period.

Figure 10:
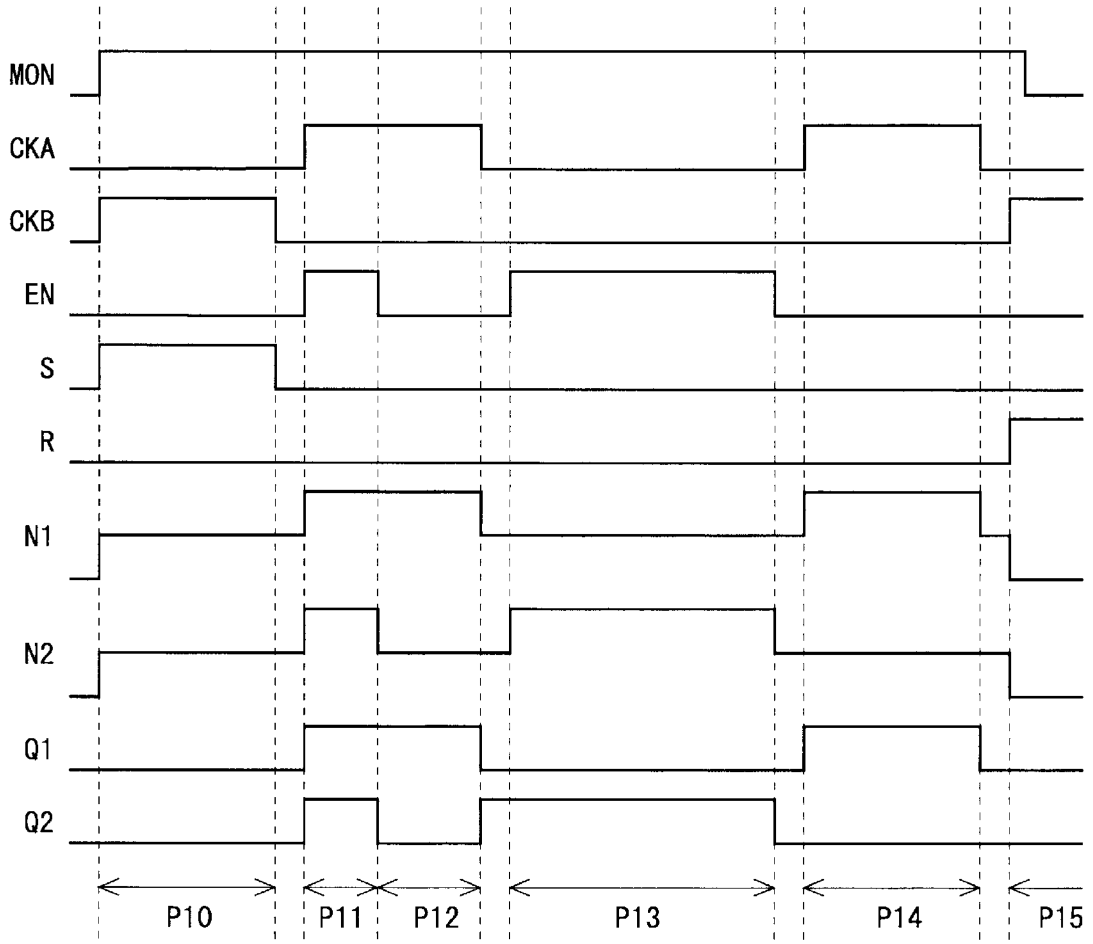
FIG. 10 is a signal waveform diagram for describing an operation of the unit circuit when the operation mode is set to the monitoring mode in the first embodiment described above.

With reference to FIG. 10, an operation of the unit circuit 22(*i*) at the i-th stage when the operation mode is set to the monitoring mode will be described. However, it is assumed that the i-th row is the monitoring row, and attention is focused on the operation when the monitoring processing is performed for the i-th row. Immediately before the start of the period P10, the potential of the first internal node N1 and the potential of the second internal node N2 are set to the low level, and the control signal MON is at the low level.

When the period P10 starts, the control signal MON changes from the low level to the high level. Thus, the transistor T15 is set to the on state. Additionally, when the period P10 starts, the set signal S changes from the low level to the high level. The pulse of this set signal S causes the transistor T11 to be in the on state, and the capacitor C11 is charged. At this time, since the transistor T15 is in the on state, the capacitor C12 is also charged. As described above, the potential of the first internal node N1 increases, the transistor T13 is turned on, and the potential of the second internal node N2 increases, and thus, the transistor T16 is turned on. However, since the first clock CKA and the enable signal EN are maintained at the low level in the period P10, the output signals Q1 and Q2 are maintained at the low level.

When the period P11 starts, the first clock CKA changes from the low level to the high level. At this time, since the transistor T13 is in the on state, the potential of the output terminal 57 (the potential of the output signal Q1) rises along with the rise of the potential of the input terminal 53. According to this, the potential of the first internal node N1 also increases via the capacitor C11. As a result, a large voltage is applied to the control terminal of the transistor T13, and the potential of the output signal Q1 rises to a level sufficient to cause the writing control transistor T1 being a connection destination of the output terminal 57 to be turned on. Additionally, when the period P11 starts, the enable signal EN changes from the low level to the high level. At this time, since the transistor T16 is in the on state, the potential of the output terminal 58 (the potential of the output signal Q2) rises along with the rise of the potential of the input terminal 55. With this, the potential of the second internal node N2 also increases via the capacitor C12 (the second internal node N2 is set to a boost state). As a result, a large voltage is applied to the control terminal of the transistor T16, and the potential of the output signal Q2 increases to a level sufficient to cause the monitoring control transistor T3 being a connection destination of the output terminal 58 to be turned on.

When the period P12 starts, the enable signal EN changes from the high level to the low level. As a result, the potential of the output terminal 58 (the potential of the output signal Q2) decreases as the potential of the input terminal 55 decreases. As the potential of the output terminal 58 decreases, the potential of the second internal node N2 also decreases via the capacitor C12. When the period P12 ends, the first clock CKA changes from the high level to the low level. As a result, the potential of the output terminal 57 (the potential of the output signal Q1) decreases as the potential of the input terminal 53 decreases. As the potential of the output terminal 57 decreases, the potential of the first internal node N1 also decreases via the capacitor C11.

When the period P13 starts, the enable signal EN changes from the low level to the high level. With this, similar to the period P11, the potential of the second internal node N2 and the potential of the output signal Q2 increase. When the period P13 ends, the enable signal EN changes from the high level to the low level. As a result, the potential of the output terminal 58 (the potential of the output signal Q2) decreases as the potential of the input terminal 55 decreases. With this, the potential of the second internal node N2 also decreases via the capacitor C12.

When the period P14 starts, the first clock CKA changes from the low level to the high level. As a result, similar to the period P11, the potential of the first internal node N1 and the potential of the output signal Q1 increase. Note that, since the enable signal EN is maintained at the low level in the period P14, the potential of the second internal node N2 does not rise. When the period P14 ends, the first clock CKA changes from the high level to the low level. As a result, the potential of the output terminal 57 (the potential of the output signal Q1) decreases as the potential of the input terminal 53 decreases. With this, the potential of the first internal node N1 also decreases via the capacitor C11.

When the period P15 starts, the reset signal R changes from the low level to the high level. Thus, the transistor T12 is set to the on state. As a result, the potential of the first internal node N1 and the potential of the second internal node N2 are set to the low level. After a small amount of time has passed from the start of the period P15, the control signal MON changes from the high level to the low level. This causes the transistor T15 to be set to the off state.

As described above, in the pixel circuit 410 in the i-th row, the writing control transistor T1 is turned on in the periods P11, P12, and P14, and the monitoring control transistor T3 is set to the on state in the periods P11 and P13. In this way, the monitoring processing for the pixel circuit 410 in the i-th row is performed in the periods P11 to P14.

Figure 11:
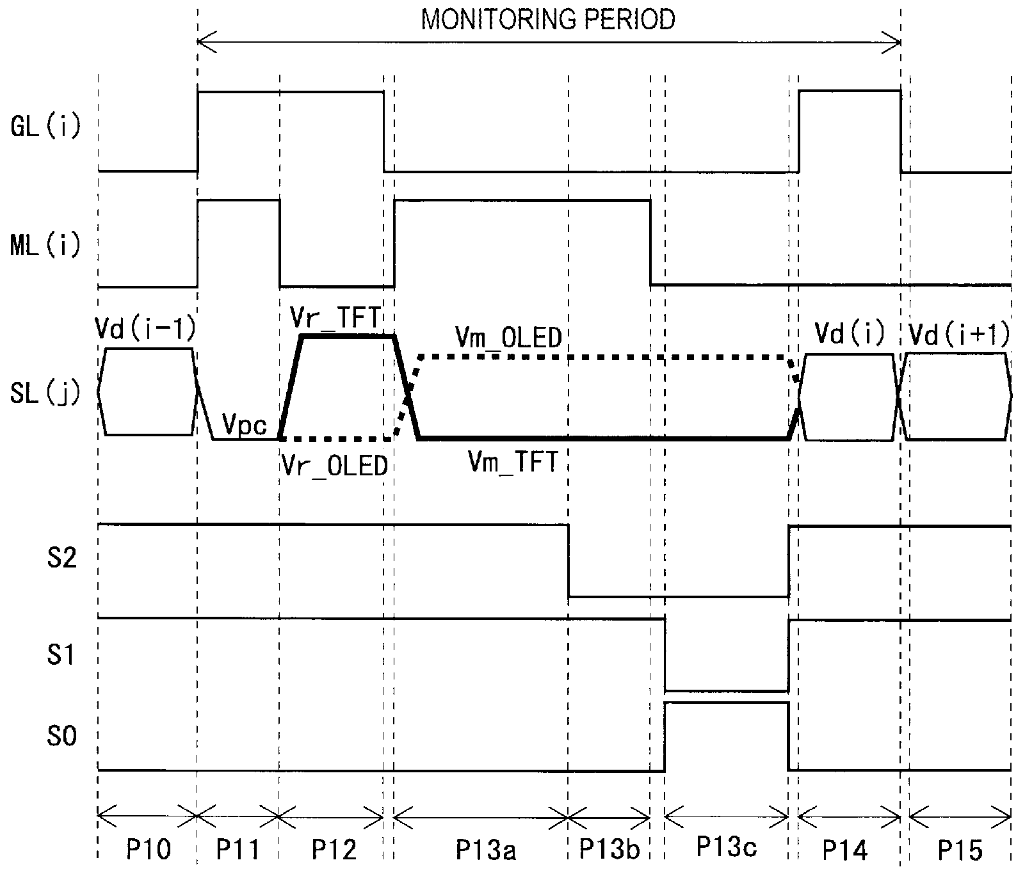
FIG. 11 is a signal waveform diagram for describing operations of the pixel circuit and a current monitoring unit when monitoring processing is performed in the first embodiment described above.

Next, the operations of the pixel circuit 410 and the current monitoring unit 320 when the monitoring processing is performed will be described with reference to FIG. 11. Here, attention is focused on the pixel circuit 410 at the i-th row and the j-th column and the current monitoring unit 320 corresponding to the j-th column. Note that the periods P10 to P12, and P14 to P15 in FIG. 11 correspond to the periods P10 to P12, and P14 to P15 in FIG. 10, and periods P13*a* to P13*c* in FIG. 11 correspond to the period P13 in FIG. 10.

In the period P10, writing is performed based on a data potential Vd(i−1) for image display in the (i−1)-th row. Immediately before the end of the period P10, the scanning signal GL(i) and the monitoring control signal ML(i) are at the low level. Thus, the writing control transistor T1 and the monitoring control transistor T3 are in the off state. Further, immediately before the end of the period P10, the control signals S2 and S1 are at the high level, and the control signal S0 is at the low level. Thus, the switches 323 and 324 are in the on state and the switch 325 is in the off state. At this time, the data signal line SL(j) and the internal data line Sin( ) are electrically connected.

When the period P11 starts, the scanning signal GL(i) and the monitoring control signal ML(i) change from the low level to the high level. This causes the writing control transistor T1 and the monitoring control transistor T3 to be set to the on state. In the period P11, an initialization potential Vpc that initializes the state of the pixel circuit 410 is applied to the data signal line SL(j). As a result, the state of the capacitor C1 and the anode potential of the organic EL element L1 are initialized.

When the period P12 starts, the monitoring control signal ML(i) changes from the high level to the low level. This causes the monitoring control transistor T3 to be in the off state. In this state, a characteristic detection potential Vr_TFT or a characteristic detection potential Vr_OLED is applied to the data signal line SL(j). The characteristic detection potential Vr_TFT is a potential set so that a current flows into the drive transistor T2 but no current flows into the organic EL element L1. The characteristic detection potential Vr_OLED is a potential set so that a current flows into the organic EL element L1 but no current flows into the drive transistor T2.

When the period P13*a* starts, the scanning signal GL(i) changes from the high level to the low level, and the monitoring control signal ML(i) changes from the low level to the high level. This causes the writing control transistor T1 to be set to the off state, and causes the monitoring control transistor T3 to be set to the on state. In this state, a current measurement potential Vm_TFT or a current measurement potential Vm_OLED is applied to the data signal line SL(j). As a result, when the TFT characteristics are being measured, a current flowing into the drive transistor T2 flows into the current monitoring unit 320 via the monitoring control transistor T3 and the data signal line SL(j), and when the OLED characteristics are being measured, a current flows from the current monitoring unit 320 to the organic EL element L1 via the data signal line SL(i) and the monitoring control transistor T3. At this time, since the control signal S2 is at the high level, the switch 323 is in the on state and no charge is accumulated in the capacitor 322. Note that the period P13*a* is set to have a length sufficient to stabilize a current to be measured that flows through the data signal line SL(j).

When the period P13*b* starts, the control signal S2 changes from the high level to the low level. This causes the switch 323 to be set to the off state, and the operational amplifier 301 and the capacitor 322 function as an integrator circuit. As a result, an output voltage of the operational amplifier 301 is a voltage corresponding to a current flowing through the data signal line SL(j).

When the period P13*c* starts, the control signal S1 changes from the high level to the low level, and the control signal S0 changes from the low level to the high level. This causes the switch 324 to be set to the off state, and causes the switch 325 to be set to the on state. When the switch 324 is in the off state, the data signal line SL(j) and the internal data line Sin(j) are electrically disconnected. In this state, the output voltage of the operational amplifier 301 (a charging voltage of the capacitor 322) is converted to a digital signal by the A/D converter 327. The digital signal is sent to the display control circuit 10 as the monitoring data MO, and is used to correct the input image signal DIN.

When the period P14 starts, the control signals S2 and S1 change from the low level to the high level, and the control signal S0 changes from the high level to the low level. This causes the switches 323 and 324 to be set to the on state, and causes the switch 325 to be set to the off state. Further, when the period P14 starts, the scanning signal GL(i) changes from the low level to the high level. Thus, the writing control transistor T1 is set to the on state. In this state, the data potential Vd(i) for image display is applied to the data signal line SL(j), and writing based on the data potential Vd(i) is performed in the pixel circuit 410 at the i-th row and the j-th column.

When the period P15 starts, the scanning signal GL(i) changes from the high level to the low level. This causes the writing control transistor T1 to be set to the off state. Note that, in the period P15, writing based on the data potential Vd(i+1) for image display is performed in the (i+1)-th row. In the period P15 and subsequent periods, the organic EL element L1 emits light, based on the writing in the period P14, in the pixel circuit 410 at the i-th row and the j-th column.

Note that the period P11 corresponds to an initialization period, the period P12 corresponds to a first writing period, the period P13*b* corresponds to a measurement period, and the period P14 corresponds to a second writing period.

1.5 Effect

Figure 31:
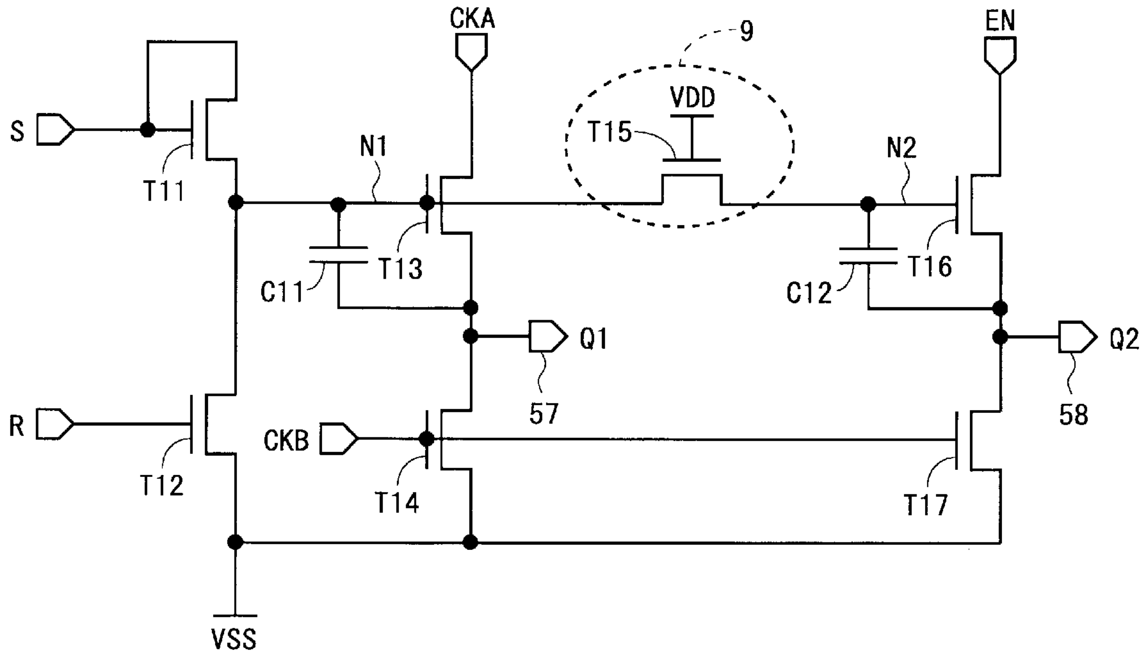
FIG. 31 is a circuit diagram illustrating a configuration of a unit circuit in a gate driver according to an example in the related art.
Figure 32:
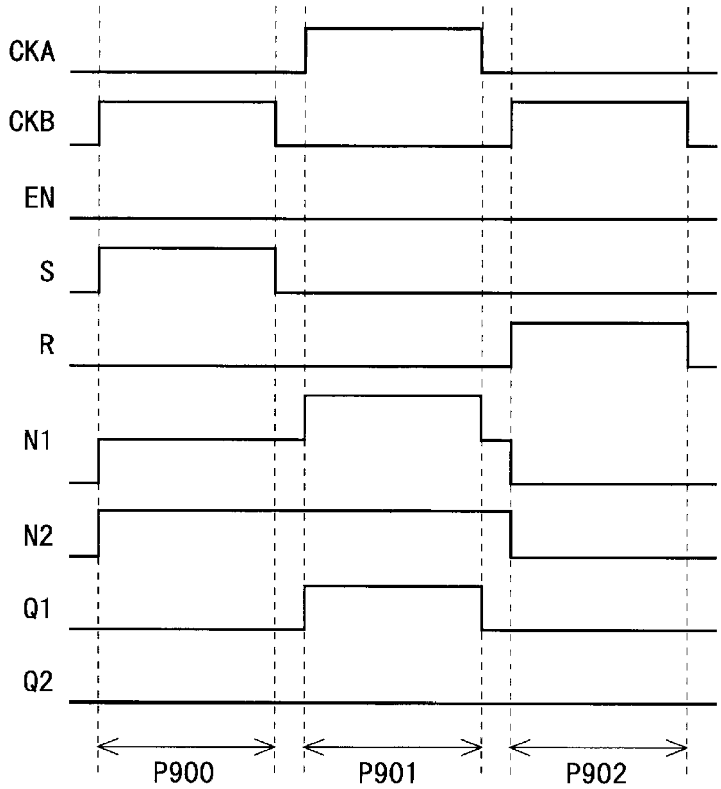
FIG. 32 is a signal waveform diagram for describing an operation of the unit circuit when writing for image display is performed according to the example in the related art.
Figure 33:
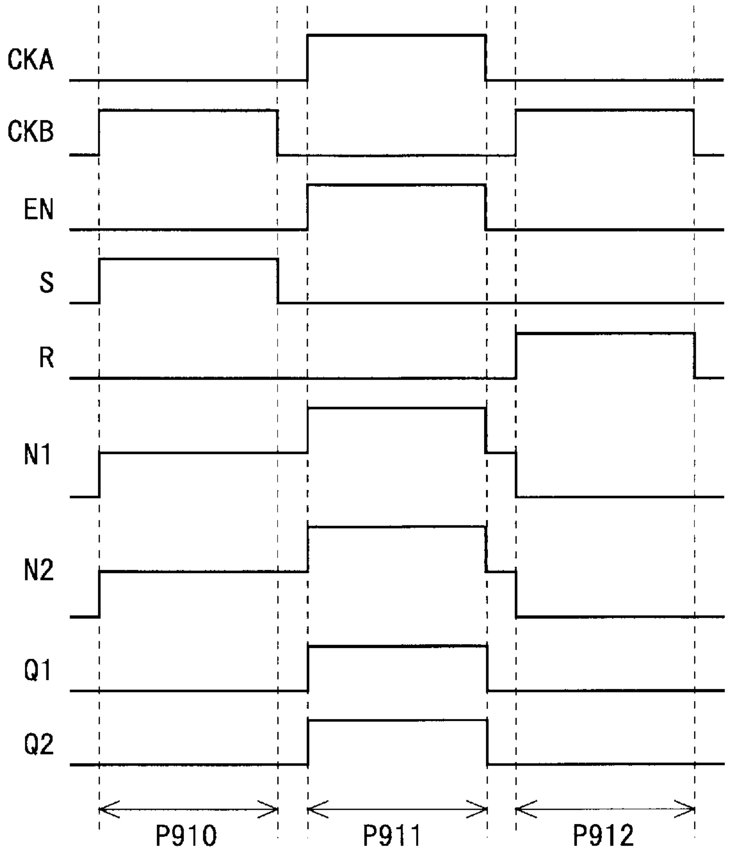
FIG. 33 is a signal waveform diagram for describing the operation of the unit circuit when monitoring processing is performed according to the example in the related art.

According to the known unit circuit illustrated in FIG. 31, the control terminal of the transistor T15 is always provided with the high level potential VDD. With this, as described above, a size of the transistor T16 needs to be increased in consideration of the application of stress, and in response to this, a frame size increases. In contrast, according to the present embodiment, when the operation mode is set to the non-monitoring mode, the transistor T15 in the unit circuit 22 is maintained in the off state. In addition, when the operation mode is set to the monitoring mode, the transistor T15 is in the on state only in the monitoring period. This significantly suppresses the application of stress to the transistor T16 functioning as a buffer transistor. As a result, the size of the transistor T16 can be reduced compared to the known technique. As described above, according to the present embodiment, the frame size of the organic EL display device having the external compensation function can be made smaller than those of the known organic EL display devices.

1.6 Modified Example

Figure 12:
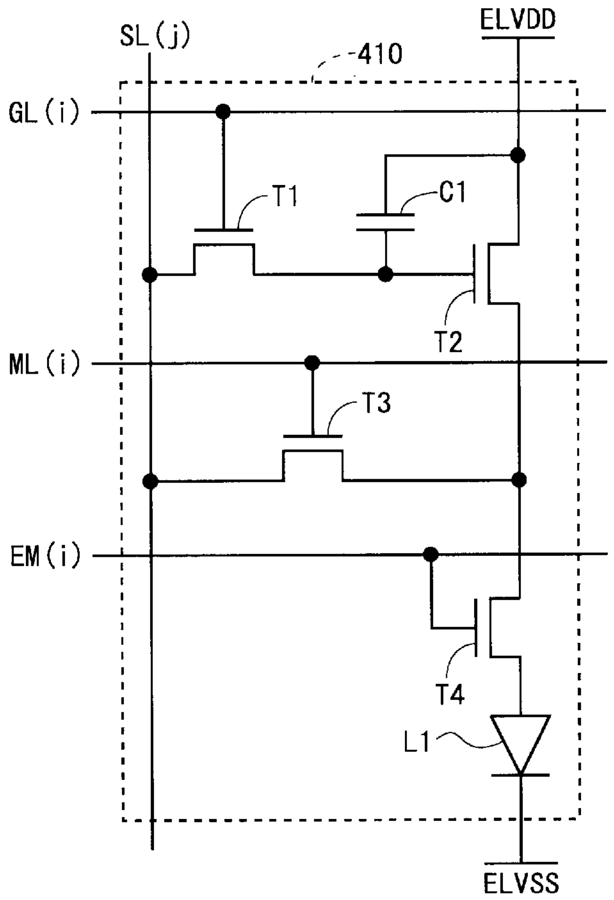
FIG. 12 is a circuit diagram illustrating a configuration of a pixel circuit according to a modified example of the first embodiment.

According to the first embodiment described above, there is a concern that display quality deteriorates because a difference in length of the light emission period of the organic EL element L1 between the monitoring row and the non-monitoring row occurs. Thus, a configuration that will be described below may be adopted so that the length of the light emission period of the organic EL element L1 is identical in all rows. A light emission control line is provided in the display portion 40 so as to correspond to each row. Further, a light emission control transistor that controls light emission of the organic EL element L1 is provided in the pixel circuit 410. As illustrated in FIG. 12, as for the light emission control transistor T4, the control terminal is connected to the light emission control line EM(i), the first conduction terminal is connected to the second conduction terminal of the drive transistor T2 and the first conduction terminal of the monitoring control transistor T3, and the second conduction terminal is connected to the anode terminal of the organic EL element L1. It is assumed that the i-th row is a monitoring row in the configuration described above, for example, the potential of the light emission control line EM(i) is controlled so that the light emission control transistor T4 is in an off state in the periods P11 to P13*c* in FIG. 11 and is in an on state in the other periods.

2. Second Embodiment

A second embodiment will be described below. An organic EL display device according to the present embodiment is a display device capable of pause driving (also referred to as "low-frequency driving") that intermittently performs operations of writing data signals to the pixel circuits 410. Note that, with regard to the pause driving, a period during which the operation of writing the data signal to the pixel circuit 410 is interrupted is referred to as a "pause period". Hereinafter, description of similar configurations to those of the first embodiment will be omitted.

2.1 Overall Configuration

Figure 13:
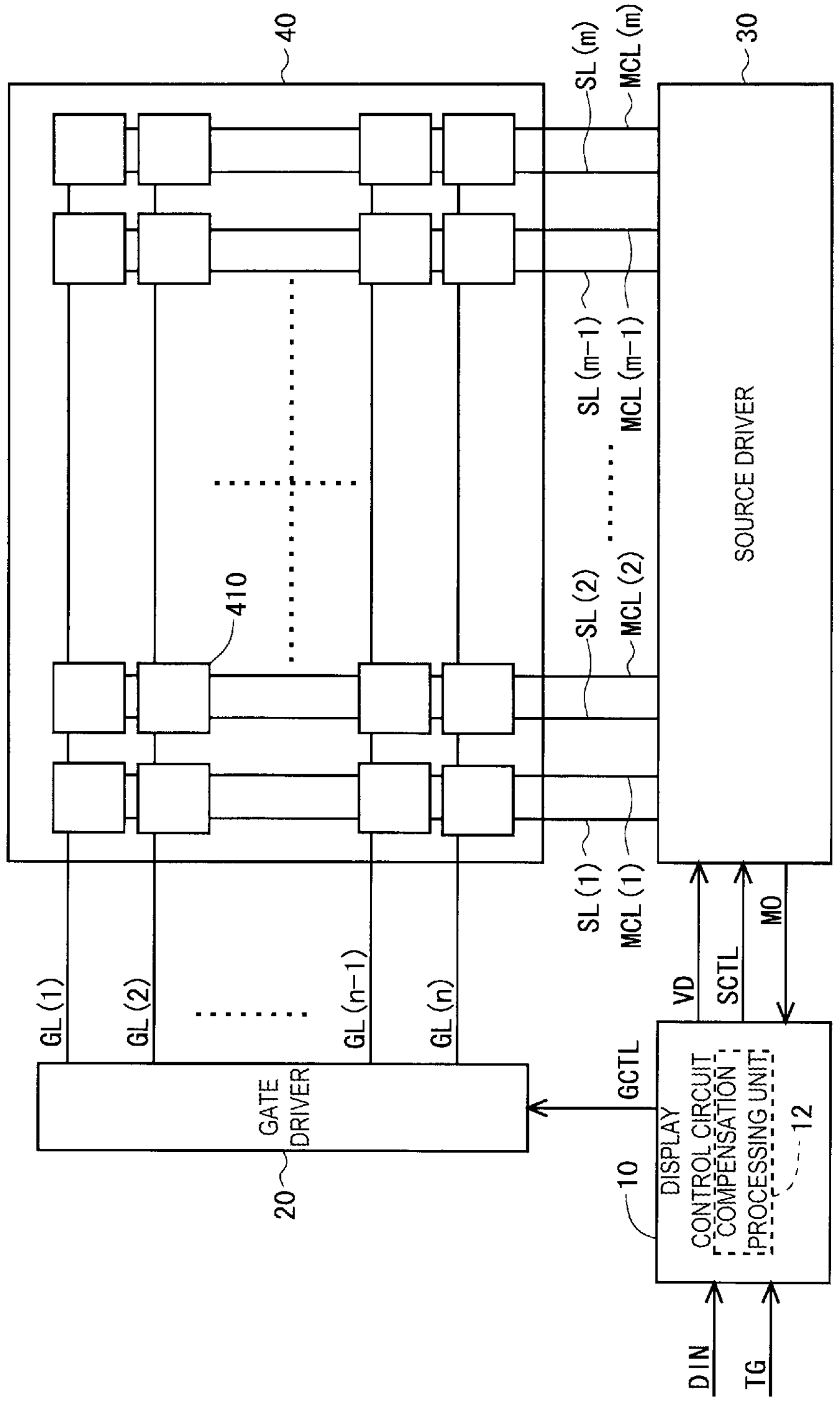
FIG. 13 is a block diagram illustrating an overall configuration of an organic EL display device according to a second embodiment.

FIG. 13 is a block diagram illustrating the overall configuration of the organic EL display device according to the present embodiment. In the first embodiment, the scanning signal lines GL(1) to GL(n), the data signal lines SL(1) to SL(m), and the monitoring control lines ML(1) to ML(n) are disposed in the display portion 40. In contrast, in the present embodiment, the scanning signal lines GL(1) to GL(n), the data signal lines SL(1) to SL(m), and current monitoring lines MCL(1) to MCL(m) are disposed in the display portion 40. The current monitoring lines MCL(1) to MCL(m) are disposed so as to correspond to the data signal lines SL(1) to SL(m) in a one-to-one manner. The current monitoring lines MCL(1) to MCL(m) and the data signal lines SL(1) to SL(m) are typically parallel to each other.

The gate driver 20 is connected to the scanning signal lines GL(1) to GL(n). Similar to the first embodiment, the gate driver 20 is configured of a shift register having a plurality of unit circuits. The gate driver 20 applies scanning signals to the scanning signal lines GL(1) to GL(n), based on the gate control signal GCTL output from the display control circuit 10.

The source driver 30 is connected to the data signal lines SL(1) to SL(m) and the current monitoring lines MCL(1) to MCL(m). The source driver 30 selectively operates to drive the data signal lines SL(1) to SL(m) and to measure currents flowing into the current monitoring lines MCL(1) to MCL (m). In other words, functionally, the source driver 30 includes a portion that functions as the data signal line drive unit 310 that drives the data signal lines SL(1) to SL(m), and a portion that functions as the current monitoring unit 320 that measures currents output from the pixel circuits 410 to the current monitoring lines MCL(1) to MCL(m) (see FIG. 3). The current monitoring unit 320 measures the currents flowing into the current monitoring lines MCL(1) to MCL (m), and outputs the monitoring data MO based on the measured values.

As described above, scanning signals are applied to the scanning signal lines GL(1) to GL(n), data signals as luminance signals are applied to the data signal lines SL(1) to SL(m), and thus, an image based on the input image signal DIN is displayed on the display portion 40. In addition, since the monitoring processing is performed and the input image signal DIN is subjected to the compensation calculation processing in accordance with the monitoring data MO, the deterioration of the drive transistors or the organic EL elements is compensated.

2.2 Pixel Circuit and Source Driver

Figure 14:
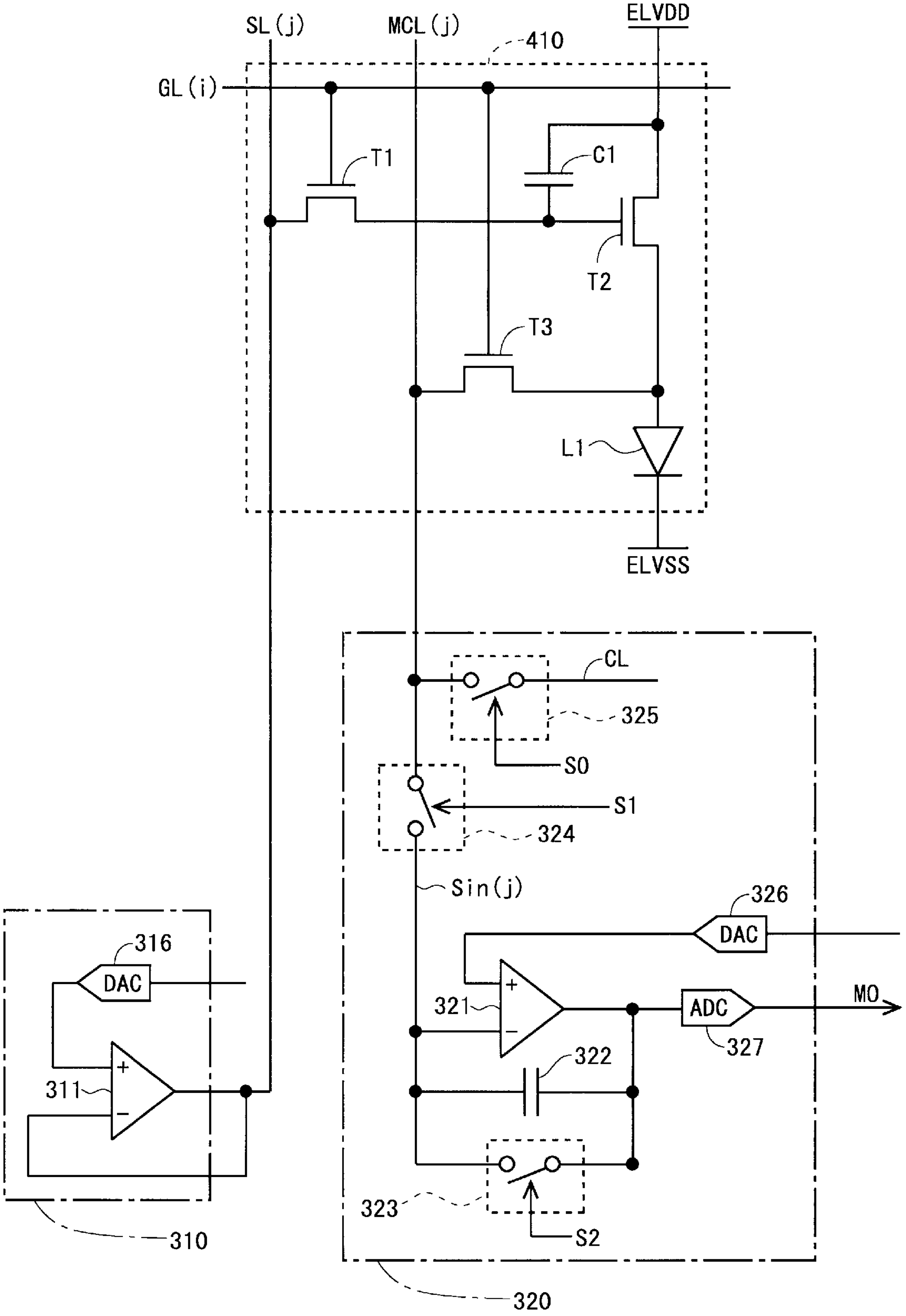
FIG. 14 is a circuit diagram illustrating a pixel circuit and a part of a source driver according to the second embodiment described above.
Figure 15:
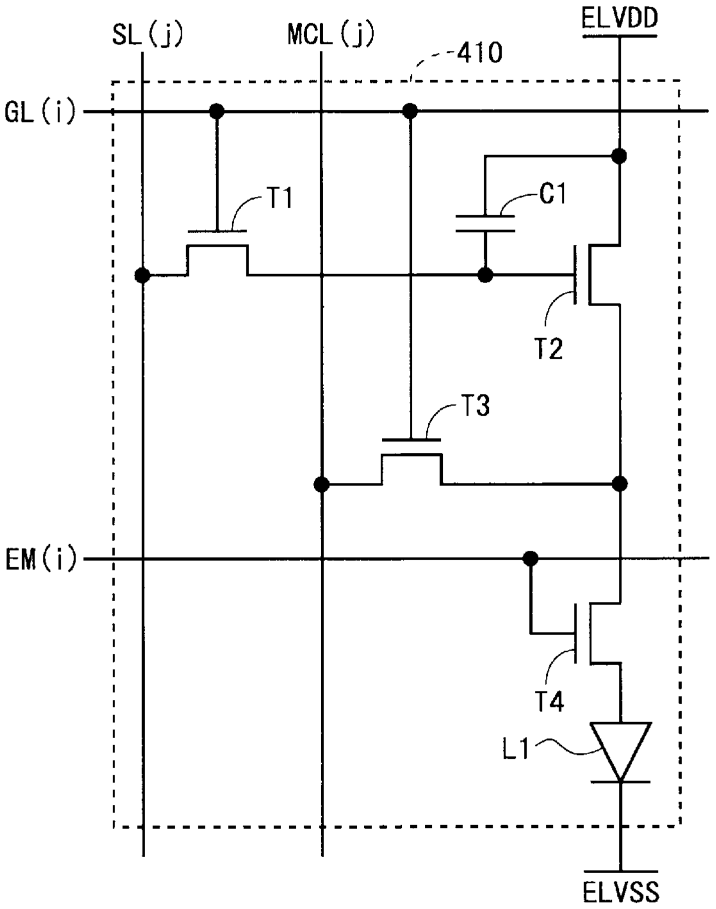
FIG. 15 is a circuit diagram illustrating a configuration of a pixel circuit according to a modified example according to the second embodiment described above.

FIG. 14 is a circuit diagram illustrating the pixel circuit 410 and a part of the source driver 30. Note that in FIG. 14, the pixel circuit 410 at the i-th row and the j-th column, and a portion of the source driver 30 corresponding to the data signal line SL(j) at the j-th column are illustrated. Similar to the first embodiment, the pixel circuit 410 includes one organic EL element L1, three transistors T1 to T3 (the writing control transistor T1, the drive transistor T2, and the monitoring control transistor T3), and one capacitor (capacitive element) C1. Note that, as for the monitoring control transistor T3, a control terminal is connected to the scanning signal line GL(i), a first conduction terminal is connected to a second conduction terminal of the drive transistor T2 and an anode terminal of the organic EL element L1, and a second conduction terminal is connected to the current monitoring line MCL(j). Note that, for a similar purpose to that of the modified example of the first embodiment, as illustrated in FIG. 15, the light emission control transistor T4 may be provided in the pixel circuit 410.

As for the source driver 30, as illustrated in FIG. 14, a portion that functions as the data signal line drive unit 310 and a portion that functions as the current monitoring unit 320 are separated. The data signal line drive unit 310 includes an operational amplifier 311 and a D/A converter 316. The current monitoring unit 320 is configured of a D/A converter 326, the A/D converter 327, an operational amplifier 321, the capacitor 322, and the three switches (switches 323, 324, and 325). Note that the operational amplifier 321 and the D/A converter 326 respectively correspond to the operational amplifier 301 and the D/A converter 306 in the first embodiment (see FIG. 4). The operation of the current monitoring unit 320 is the same as that of the first embodiment, and thus, the description thereof will be omitted. However, the current monitoring unit 320 in the present embodiment measures a current flowing through the current monitoring line MCL.

2.3 Gate Driver

Figure 16:
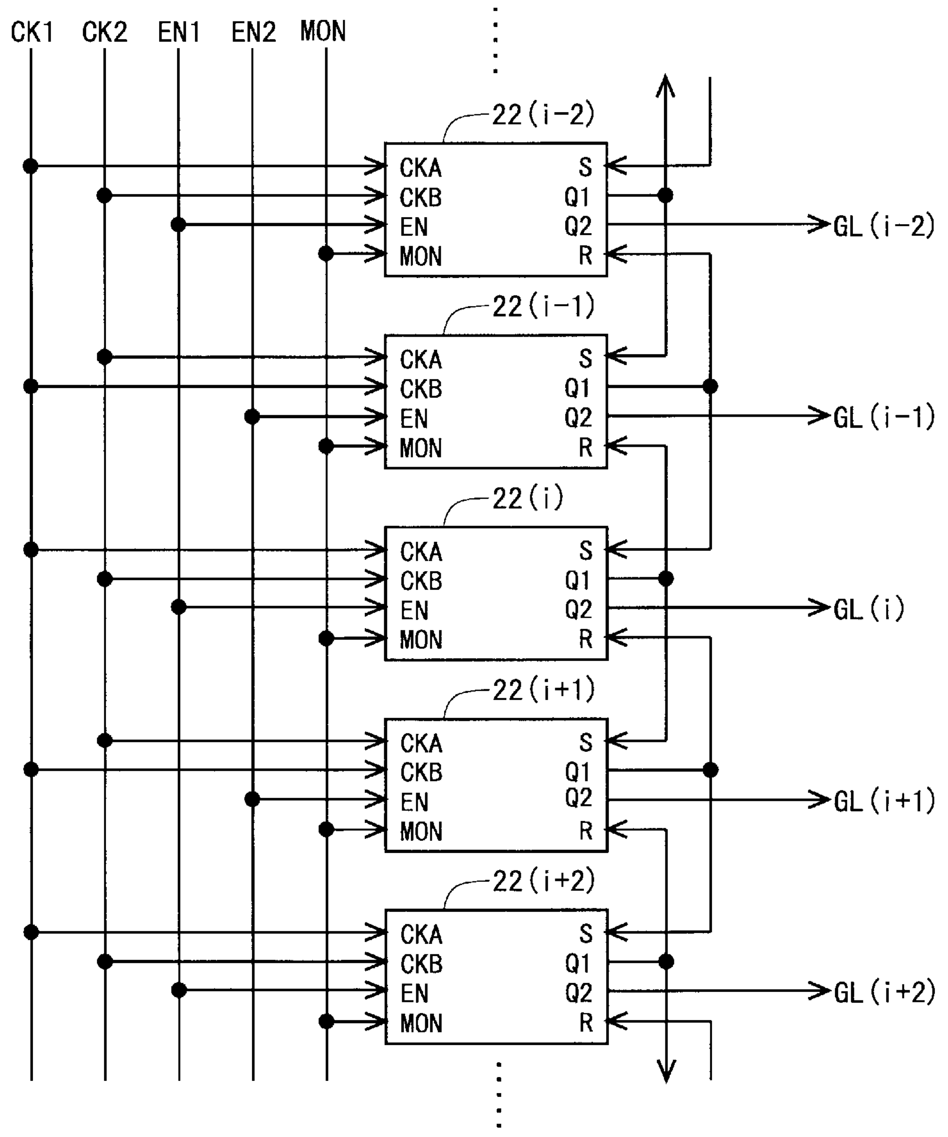
FIG. 16 is a block diagram illustrating a configuration of a shift register having five stages and configuring a gate driver according to the second embodiment described above.

A detailed configuration of the gate driver 20 according to the present embodiment will be described. FIG. 16 is a block diagram illustrating a configuration of a shift register having five stages. The output signal Q1 from the unit circuit 22 at each stage is provided as the reset signal R to the unit circuit 22 at the previous stage, and is provided as the set signal S to the unit circuit 22 at the next stage. The output signal Q2 from the unit circuit 22 at each stage is provided as a scanning signal to the corresponding scanning signal line GL. The other configurations are the same as those of the first embodiment. A configuration of the unit circuit 22 is the same as that of the first embodiment (see FIG. 1).

2.4 Driving Method 2.4.1 Overview

In the present embodiment, a normal mode and a pause mode are provided as an operation mode related to a drive frequency. When the operation mode is set to the normal mode, normal image display is repeated without interruption to an operation for writing during an operation of the organic EL display device. When the operation mode is set to the pause mode, pause driving is performed that intermittently performs the operation for writing. In addition, a monitoring mode and a non-monitoring mode are prepared as an operation mode related to the monitoring processing. In the present embodiment, when the operation mode is set to the monitoring mode, the monitoring processing is performed for at least one row during a pause period. Hereinafter, for convenience, a combination of the normal mode and the non-monitoring mode is referred to as a “first mode”, a combination of the pause mode and the non-monitoring mode is referred to as a “second mode”, and a combination of the pause mode and the monitoring mode is referred to as a “third mode”. The normal mode and the monitoring mode are not combined. In other words, in the present embodiment, the monitoring processing is performed only when the pause driving is performed.

Figure 17:
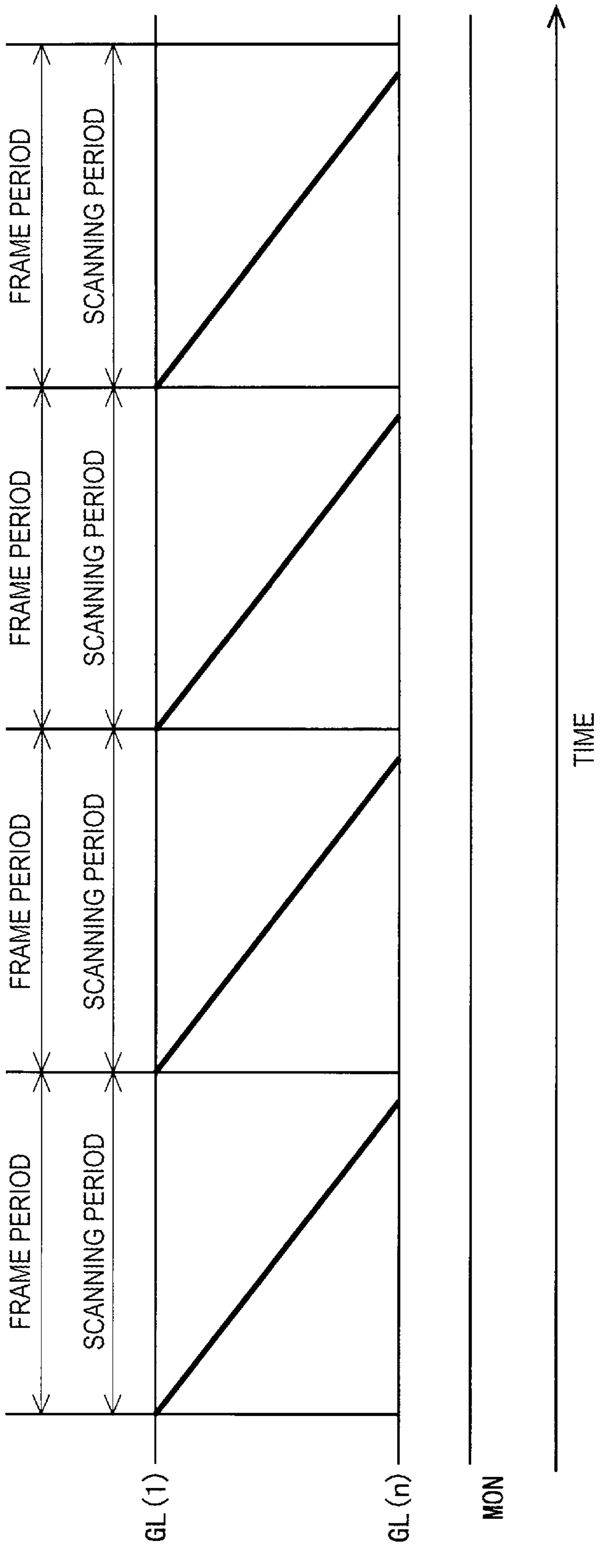
FIG. 17 is a diagram for describing a schematic operation when an operation mode is set to a first mode in the second embodiment described above.

An operation in each mode will be described below with reference to FIG. 17 to FIG. 19. When the operation mode is set to the first mode, as illustrated in FIG. 17, a frame period (frame period including only a scanning period) during which normal image display is performed continues, without a pause period being provided. In this way, the monitoring processing is not performed when the operation mode is set to the first mode. The control signal MON is maintained at the high level. Thus, when the operation mode is set to the first mode, the transistor T15 in the unit circuit 22 is maintained in the on state except for a part of the frame period (a period in which the potential of the second internal node N2 is higher than the normal high level).

Figure 18:
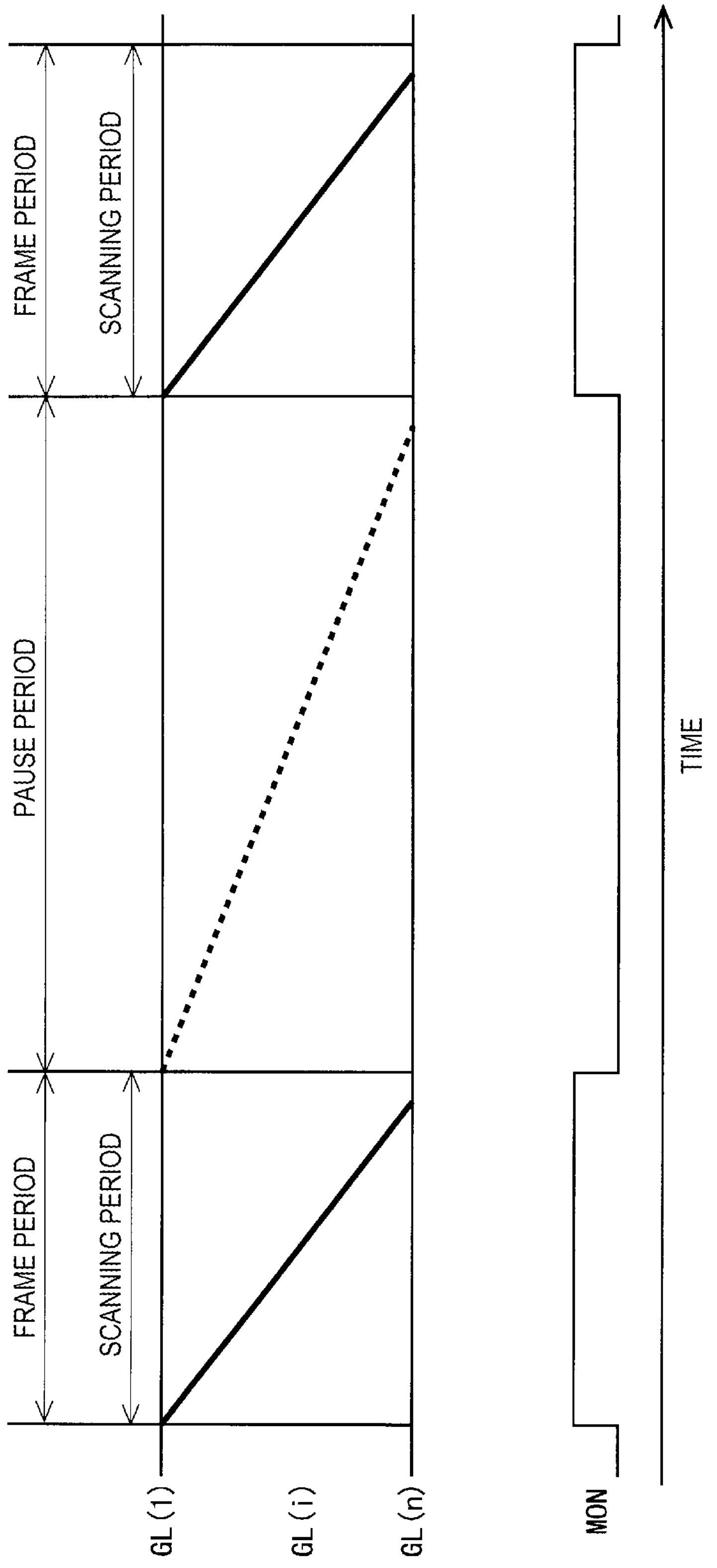
FIG. 18 is a diagram for describing a schematic operation when the operation mode is set to a second mode in the second embodiment described above.

When the operation mode is set to the second mode, as illustrated in FIG. 18, a pause period appears between two frame periods. Each frame period includes only a scanning period. In other words, only the operation for writing is performed in each frame period without the monitoring processing being performed. In the pause period, only a shifting operation in the shift register is performed without scanning the scanning signal lines GL. As described above, the monitoring processing is not performed when the operation mode is set to the second mode. Note that in FIG. 18, a state in which the shifting operation from the unit circuit 22(1) at the first stage to the unit circuit 22(*n*) at the n-th stage is performed in the shift register without scanning the scanning signal lines GL is schematically illustrated by using a thick dotted line (also similarly to FIG. 19). The control signal MON is maintained at the high level in the frame period (scanning period), and is maintained at the low level in the pause period. As a result, the transistor T15 in the unit circuit 22 is maintained in the on state in the frame period (scanning period) except for a part of the frame period (a period in which the potential of the second internal node N2 is higher than the normal high level), and is maintained in the off state in the pause period.

When the operation mode is set to the third mode, a pause period appears between two frame periods, similarly when the operation mode is set to the second mode. However, as illustrated in FIG. 19, a monitoring period for performing the monitoring processing is included in the pause period. In the period other than the monitoring period, of the pause period, only the shifting operation in the shift register is performed without scanning the scanning signal lines GL. The control signal MON is maintained at the high level in the frame period (scanning period), and is maintained at the high level only in the monitoring period, of the pause period, and maintained at the low level in the period other than the monitoring period, of the pause period. As a result, the transistor T15 in the unit circuit 22 is maintained in the on state in the frame period (scanning period) except for a part of the frame period (a period in which the potential of the second internal node N2 is higher than the normal high level), and is maintained in the on state only in the monitoring period, of the pause period, and maintained in the off state in the period other than the monitoring period, of the pause period.

When the operation mode is set to the third mode, the pause period is longer than that when the operation mode is set to the second mode. In other words, the pause period including the monitoring processing is longer than the pause period not including the monitoring processing.

2.4.2 Operation when Operation Mode is Set to First Mode

Figure 20:
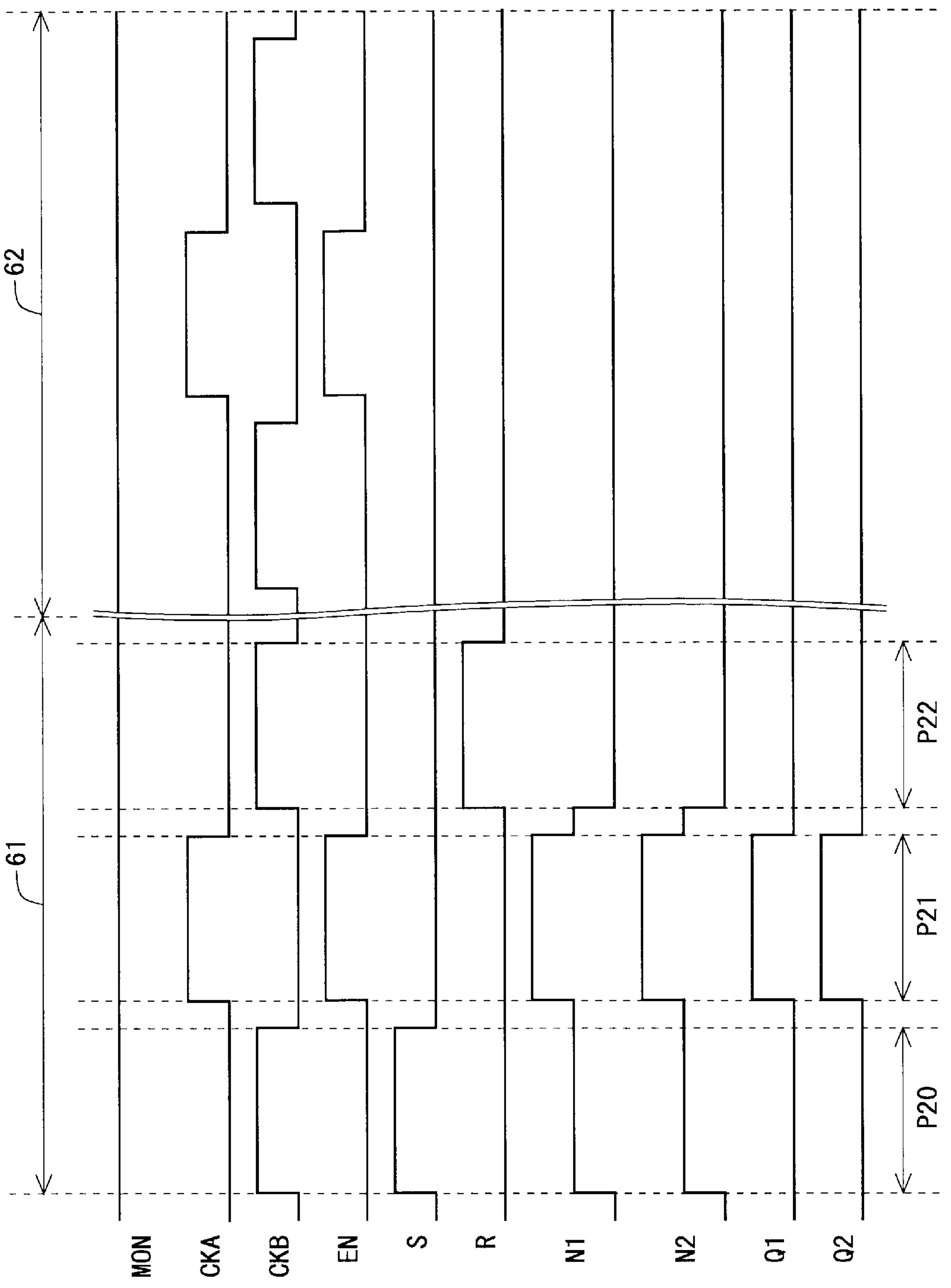
FIG. 20 is a signal waveform diagram for describing an operation of the unit circuit when the operation mode is set to the first mode in the second embodiment described above.

With reference to FIG. 20, an operation of the unit circuit 22(*i*) at the i-th stage when the operation mode is set to the first mode will be described. In FIG. 20, a portion indicated by the arrow denoted by a reference sign 61 indicates a waveform of each signal when writing to the i-th row is performed. In FIG. 20, a portion indicated by the arrow denoted by a reference sign 62 indicates a waveform of each signal when writing to the rows other than the i-th row is performed. As illustrated in FIG. 20, the control signal MON is maintained at the high level. Thus, the transistor T15 in the unit circuit 22 is maintained in the on state.

Immediately before the start of a period P20, the potential of the first internal node N1 and the potential of the second internal node N2 are set to the low level. When the period P20 starts, the set signal S changes from the low level to the high level. The pulse of this set signal S causes the transistor T11 to be in the on state, and the capacitor C11 is charged. At this time, since the transistor T15 is in the on state, the capacitor C12 is also charged. As described above, the potential of the first internal node N1 increases, the transistor T13 is turned on, and the potential of the second internal node N2 increases, and thus, the transistor T16 is turned on. However, since the first clock CKA and the enable signal EN are maintained at the low level in the period P20, the output signals Q1 and Q2 are maintained at the low level.

When a period P21 starts, the first clock CKA changes from the low level to the high level. At this time, since the transistor T13 is in the on state, the potential of the output terminal 57 (the potential of the output signal Q1) rises along with the rise of the potential of the input terminal 53. According to this, the potential of the first internal node N1 also increases via the capacitor C11. As a result, a high voltage is applied to the control terminal of the transistor T13 to sufficiently increase the potential of the output signal Q1. Additionally, when the period P21 starts, the enable signal EN changes from the low level to the high level. At this time, since the transistor T16 is in the on state, the potential of the output terminal 58 (the potential of the output signal Q2) rises along with the rise of the potential of the input terminal 55. According to this, the potential of second internal node N2 also increases via the capacitor C12. As a result, a large voltage is applied to the control terminal of the transistor T16, and the potential of the output signal Q2 increases to a level sufficient to cause the writing control transistor T1 being a connection destination of the output terminal 58 and the monitoring control transistor T3 to be turned on. Thus, the writing is performed in the pixel circuit 410 in the i-th row.

When the period P21 ends, the first clock CKA changes from the high level to the low level. As a result, the potential of the output terminal 57 (the potential of the output signal Q1) decreases as the potential of the input terminal 53 decreases. As the potential of the output terminal 57 decreases, the potential of the first internal node N1 also decreases via the capacitor C11. Additionally, when the period P21 ends, the enable signal EN changes from the high level to the low level. As a result, the potential of the output terminal 58 (the potential of the output signal Q2) decreases as the potential of the input terminal 55 decreases. As the potential of the output terminal 58 decreases, the potential of the second internal node N2 also decreases via the capacitor C12.

When a period P22 starts, the reset signal R changes from the low level to the high level. Thus, the transistor T12 is set to the on state. As a result, the potential of the first internal node N1 and the potential of the second internal node N2 are set to the low level.

When writing to the rows other than the i-th row is performed, since the pulse of the set signal S is not input to the unit circuit 22(*i*) at the i-th stage, the potential of the first internal node N1, the potential of the second internal node N2, the potential of the output signal Q1, and the potential of the output signal Q2 are maintained at the low level (see the portion indicated by the arrow denoted by a reference sign 62 in FIG. 20).

2.4.3 Operation when Operation Mode is Set to Second Mode

In this case, the unit circuit 22 operates in a similar manner to that when the operation mode is set to the first mode (see FIG. 20) in the frame period (scanning period) (see FIG. 18) during which normal image display is performed.

Figure 21:
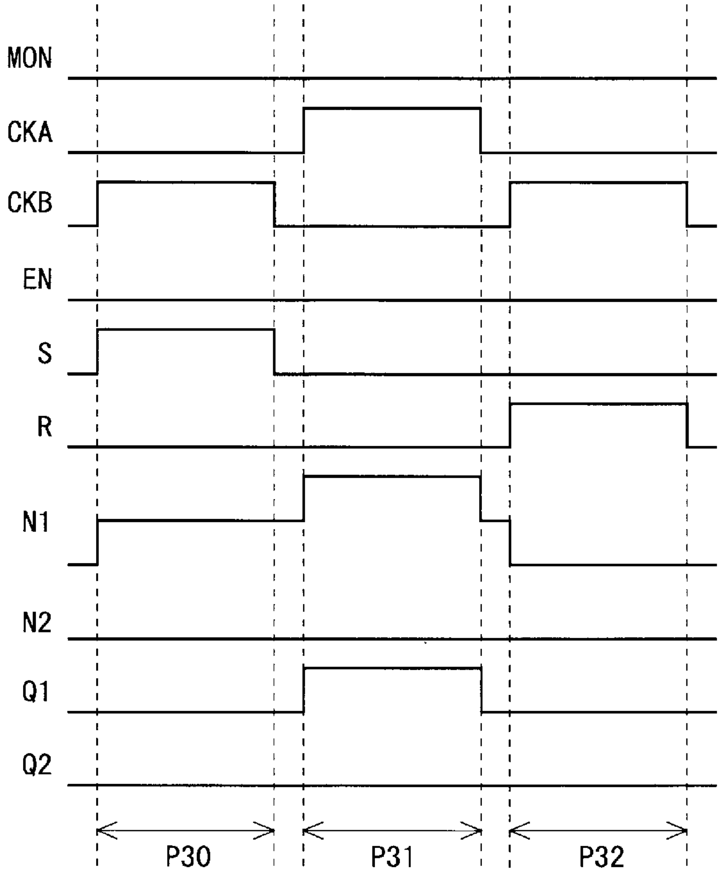
FIG. 21 is a signal waveform diagram for describing an operation of the unit circuit when a shift pulse is provided in a pause period in a case in which the operation mode is set to the second mode in the second embodiment described above.

With reference to FIG. 21, an operation of the unit circuit 22(*i*) at the i-th stage when a shift pulse (pulse of the set signal S) is provided to the unit circuit 22(*i*) at the i-th stage during the pause period, in this case, will be described. Immediately before the start of a period P30, the potential of the first internal node N1 and the potential of the second internal node N2 are set to the low level.

When the period P30 starts, the set signal S changes from the low level to the high level. The pulse of this set signal S causes the transistor T11 to be in the on state, and the capacitor C11 is charged. This increases the potential of the first internal node N1 to set the transistor T13 to the on state. However, in the period P30, the first clock CKA is maintained at the low level, and thus, the output signal Q1 is maintained at the low level. In addition, in the period P30, the control signal MON is maintained at the low level, and thus, the transistor T15 is maintained in the off state. Thus, the potential of second internal node N2 does not rise.

When a period P31 starts, the first clock CKA changes from the low level to the high level. As a result, similar to the above-described period P21, the potential of the output signal Q1 sufficiently increases. When the period P31 ends, the first clock CKA changes from the high level to the low level. As a result, similar to when the period P21 ends, the potential of the output terminal 57 (the potential of the output signal Q1) and the potential of the first internal node N1 are decreased. When the period P32 starts, the reset signal R changes from the low level to the high level. Thus, similar to the above-described period P22, the potential of the first internal node N1 is set to the low level.

Figure 22:
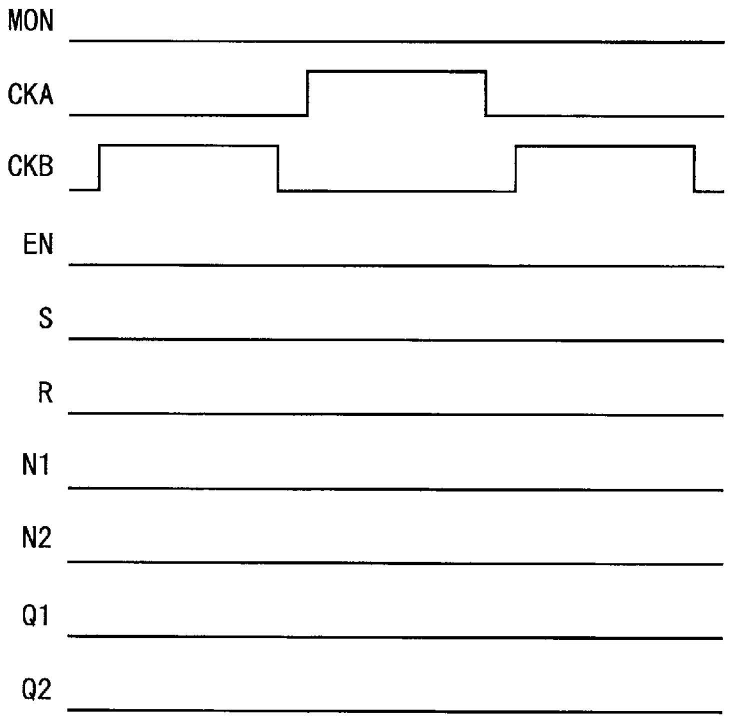
FIG. 22 is a signal waveform diagram for describing an operation of the unit circuit when a shift pulse is not provided in a case in which the operation mode is set to the second mode in the second embodiment described above.

Note that, in a period in which a shift pulse is not applied to the unit circuit 22(*i*) at the i-th stage, as illustrated in FIG. 22, in the unit circuit 22(*i*) at the i-th stage, the potential of the first internal node N1 and the potential of the second internal node N2 are maintained at the low level, and the potentials of the output signals Q1 and Q2 are maintained at the low level.

2.4.3 Operation when Operation Mode is Set to Third Mode

In this case, the unit circuit 22 operates in a similar manner to that when the operation mode is set to the first mode (see FIG. 20) in the frame period (scanning period) (see FIG. 19) during which normal image display is performed. In this case, in a period other than the monitoring period of the pause period, the unit circuit 22 operates in a similar manner to the pause period when the operation mode is set to the second mode (see FIG. 21 and FIG. 22).

Figure 23:
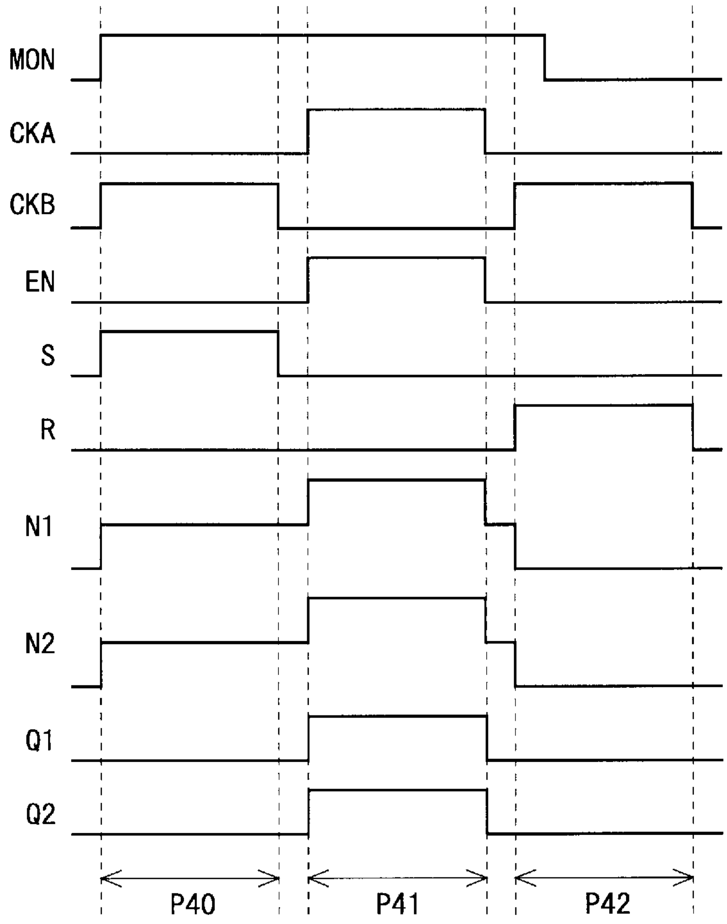
FIG. 23 is a signal waveform diagram for describing an operation of the unit circuit during a monitoring period of a pause period in a case in which the operation mode is set to the third mode in the second embodiment described above.

With reference to FIG. 23, an operation of the unit circuit 22(*i*) at the i-th stage in the monitoring period of the pause period in this case will be described. However, it is assumed that the i-th row is the monitoring row, and attention is focused on the operation when the monitoring processing is performed for the i-th row. Immediately before the start of a period P40, the potential of the first internal node N1 and the potential of the second internal node N2 are set to the low level, and the control signal MON is at the low level.

When the period P40 starts, the control signal MON changes from the low level to the high level. Thus, the transistor T15 is set to the on state. Additionally, when the period P40 starts, the set signal S changes from the low level to the high level. The pulse of this set signal S causes the transistor T11 to be in the on state, and the capacitor C11 is charged. At this time, since the transistor T15 is in the on state, the capacitor C12 is also charged. As described above, the potential of the first internal node N1 increases, the transistor T13 is turned on, and the potential of the second internal node N2 increases, and thus, the transistor T16 is turned on. However, since the first clock CKA and the enable signal EN are maintained at the low level in the period P40, the output signals Q1 and Q2 are maintained at the low level.

When a period P41 starts, the first clock CKA and the enable signal EN change from the low level to the high level. As a result, similar to the period P21 described above, the potential of the output signal Q1 sufficiently increases, and the potential of the output signal Q2 increases to a level sufficient to cause the writing control transistor T1 being a connection destination of the output terminal 58 and the monitoring control transistor T3 to be in the on state.

When the period P41 ends, the first clock CKA and the enable signal EN change from the high level to the low level. As a result, similarly when the period P21 ends, the potential of the output signal Q1 and the potential of the output signal Q2 are decreased. According to this, the potential of the first internal node N1 and the potential of the second internal node N2 decrease.

When a period P42 starts, the reset signal R changes from the low level to the high level. As a result, similar to the above-described period P22, the potentials of the first internal node N1 and the second internal node N2 are set to the low level.

As described above, in the pixel circuit 410 in the i-th row, the writing control transistor T1 and the monitoring control transistor T3 are in the on state in the period P41. As a result, in the period P41, the monitoring processing is performed in the pixel circuit 410 in the i-th row.

Figure 24:
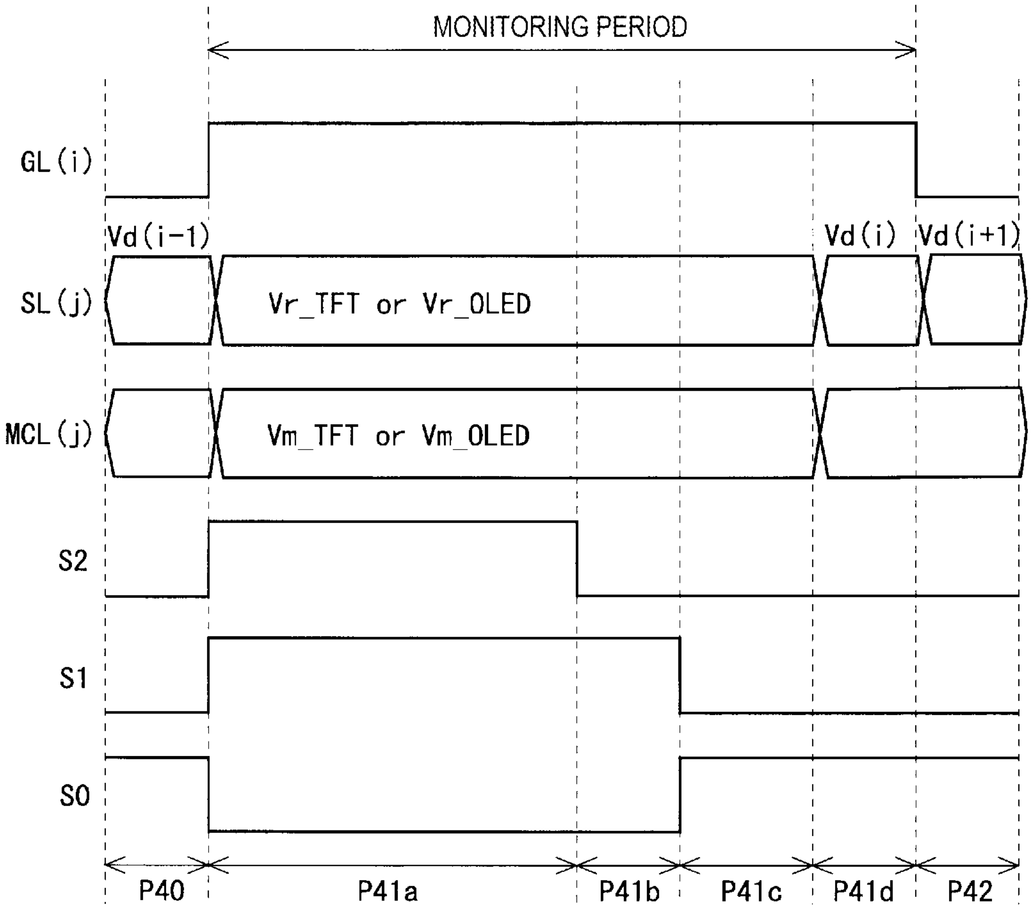
FIG. 24 is a signal waveform diagram for describing operations of the pixel circuit and a current monitoring unit when monitoring processing is performed in the second embodiment described above.

Next, the operations of the pixel circuit 410 and the current monitoring unit 320 when the monitoring processing is performed will be described with reference to FIG. 24. Here, attention is focused on the pixel circuit 410 at the i-th row and the j-th column and the current monitoring unit 320 corresponding to the j-th column. Note that periods P40 and P42 in FIG. 24 correspond to the periods P40 and P42 in FIG. 23, and periods P41*a* to P41*d* in FIG. 24 correspond to the period P41 in FIG. 23.

In the period P40, writing is performed based on the data potential Vd (i−1) for image display in the (i−1)-th row. Immediately before the end of the period P40, the scanning signal GL(i) is at the low level. Thus, the writing control transistor T1 and the monitoring control transistor T3 are in the off state. Further, immediately before the end of the period P40, the control signals S2 and S1 are at the low level, and the control signal S0 is at the high level. Thus, the switches 323 and 324 are in the off state and the switch 325 is in the on state. At this time, the current monitoring line MCL(j) and the internal data line Sin(j) are electrically disconnected.

When the period P41*a* starts, the scanning signal GL(i) changes from the low level to the high level. This causes the writing control transistor T1 and the monitoring control transistor T3 to be set to the on state. In addition, in the period P41*a*, the control signals S2 and S1 change from the low level to the high level, and the control signal S0 changes from the high level to the low level. This causes the switches 323 and 324 to be set to the on state and causes the switch 325 to be set to the off state. As a result, the current monitoring line MCL( ) and the internal data line Sin(i) are electrically connected. In the period P41*a*, in the state described above, the characteristic detection potential Vr_TFT or the characteristic detection potential Vr_OLED is applied to the data signal line SL(j), and the current measurement potential Vm_TFT or the current measurement potential Vm_OLED is applied to the current monitoring line MCL(j). The characteristic detection potential Vr_TFT and the current measurement potential Vm_TFT are potentials set so that a current flows into the drive transistor T2 but no current flows into the organic EL element L1. The characteristic detection potential Vr_OLED and the current measurement potential Vm_OLED are potentials set so that a current flows into the organic EL element L1 but no current flows into the drive transistor T2. Note that the period P41*a* is set to have a length sufficient to stabilize a current to be measured that flows through the current monitoring line MCL( ).

When the period P41*b* starts, the control signal S2 changes from the high level to the low level. This causes the switch 323 to be set to the off state, and the operational amplifier 321 and the capacitor 322 function as an integrator circuit. As a result, the output voltage of the operational amplifier 321 is a voltage corresponding to the current flowing through the current monitoring line MCL(j).

When the period P41*c* starts, the control signal S1 changes from the high level to the low level, and the control signal S0 changes from the low level to the high level. This causes the switch 324 to be set to the off state, and causes the switch 325 to be set to the on state. When the switch 324 is set to the off state, the current monitoring line MCL(j) and the internal data line Sin(j) are electrically disconnected. In this state, the output voltage of the operational amplifier 321 (a charging voltage of the capacitor 322) is converted to a digital signal by the A/D converter 327. The digital signal is sent to the display control circuit 10 as the monitoring data MO, and is used to correct the input image signal DIN.

When the period P41*d* starts, the data potential Vd(i) for image display is applied to the data signal line SL(j). At this time, the writing control transistor T1 is in the on state. Thus, the writing is performed based on the data potential Vd(i) in the pixel circuit 410 at the i-th row and the j-th column.

When the period P42 starts, the scanning signal GL(i) changes from the high level to the low level. This causes the writing control transistor T1 and the monitoring control transistor T3 to be set to the off state. Note that, in the period P42, writing is performed based on the data potential Vd(i+1) for image display in the (i+1)-th row. In the period P42 and subsequent periods, the organic EL element L1 emits light based on the writing in the period P41*d* in the pixel circuit 410 at the i-th row and the j-th column.

2.5 Effect

According to the present embodiment, when the operation mode is set to the first mode, the transistor T15 in the unit circuit 22 is maintained in the off state. Also, when the operation mode is set to the second mode, the transistor T15 is maintained in the off state throughout the pause period. Furthermore, when the operation mode is set to the third mode, the transistor T15 is maintained in the off state for a period other than the monitoring period of the pause period. As described above, stress applied to the transistor T16 functioning as a buffer transistor is significantly suppressed. As a result, the size of the transistor T16 can be reduced compared to the known technique. As described above, similar to the first embodiment, the frame size of the organic EL display device having the external compensation function can be made smaller than those of the known organic EL display devices.

3. Third Embodiment 3.1 Overview of Configuration

A third embodiment will be described below. In the first embodiment, the real-time monitoring is performed. In the second embodiment, the monitoring processing is performed during the pause period when the pause driving is performed. In contrast to these, an organic EL display device according to the present embodiment can perform the real-time monitoring, and can perform the monitoring processing during the pause period by employing the pause driving. That is, in the present embodiment, a first method in which the real-time monitoring is performed as a method of the monitoring processing and a second method in which the monitoring processing is performed during the pause period are prepared, and the monitoring processing can be performed by the method selected from the two methods.

The overall configuration of the organic EL display device is the same as that of the first embodiment. In other words, as illustrated in FIG. 2, in the display portion 40, the monitoring control lines ML(1) to ML(n) are disposed in addition to the scanning signal lines GL(1) to GL(n) and the data signal lines SL(1) to SL(m). The configurations of the pixel circuit 410 and the current monitoring unit 320 are the same as those of the first embodiment (see FIG. 4).

3.2 Gate Driver

Figure 25:
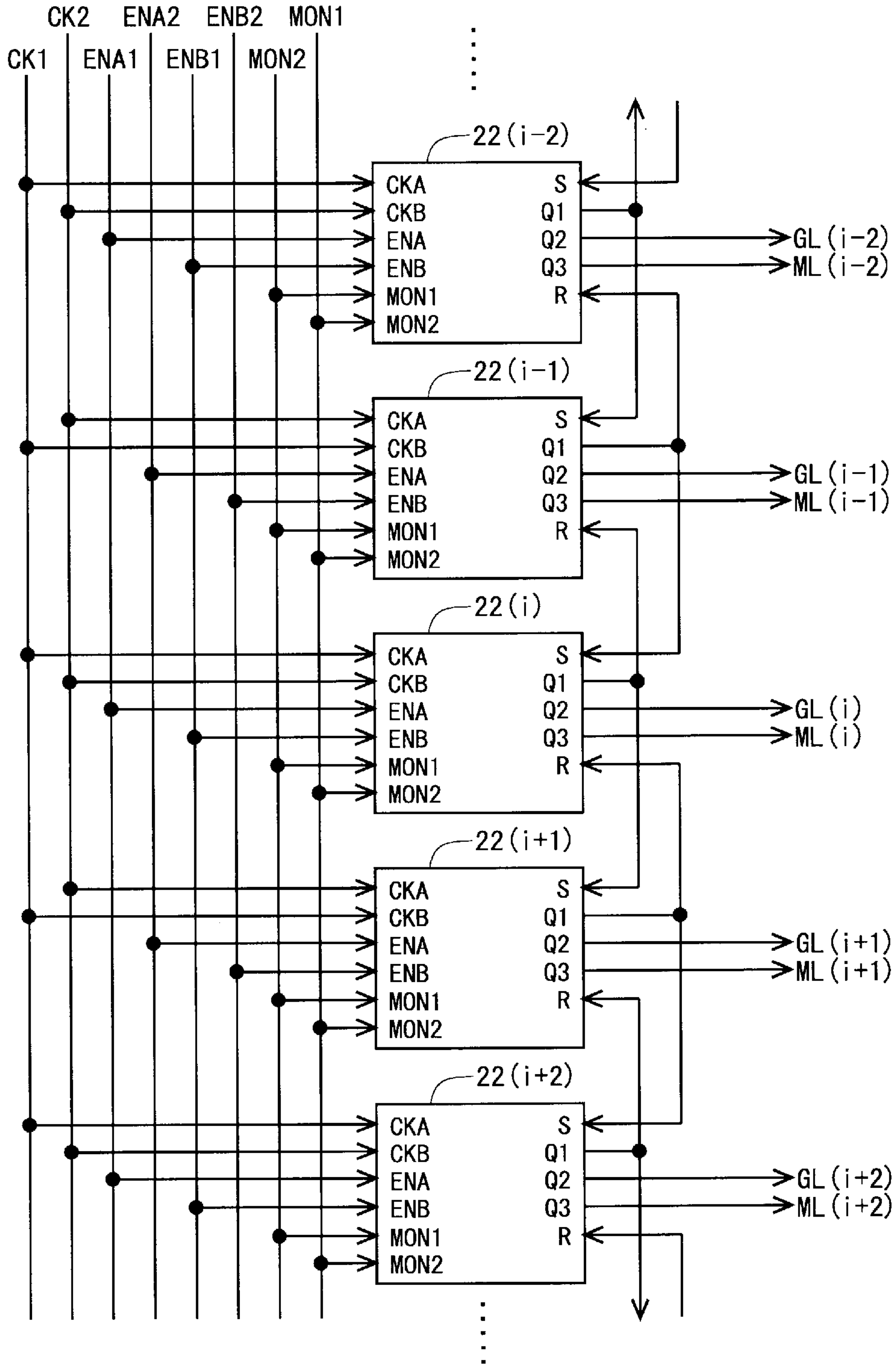
FIG. 25 is a block diagram illustrating a configuration of a shift register including five stages and configuring a gate driver according to a third embodiment.

A detailed configuration of the gate driver 20 according to the present embodiment will be described. FIG. 25 is a block diagram illustrating a configuration of a shift register having five stages and being included in the gate driver 20. This shift register is provided with a gate start pulse signal, a clock signal CK1, a clock signal CK2, an enable signal ENA1, an enable signal ENA2, an enable signal ENB1, an enable signal ENB2, a control signal MON1, and a control signal MON2 as the gate control signal GCTL. Note that the gate start pulse signal is a signal provided to the unit circuit 22(1) at the first stage as the set signal S, and is omitted in FIG. 25.

Each unit circuit 22 includes input terminals configured to receive each of the first clock CKA, the second clock CKB, the enable signal ENA, the enable signal ENB, the control signal MON1, the control signal MON2, the set signal S, and the reset signal R, and output terminals configured to output each of the output signal Q1, the output signal Q2, and an output signal Q3.

As for the unit circuit 22 at the odd-numbered stage, the clock signal CK1 is provided as the first clock CKA, the clock signal CK2 is provided as the second clock CKB, the enable signal ENA1 is provided as the enable signal ENA, and the enable signal ENB1 is provided as the enable signal ENB. As for the unit circuit 22 at the even-numbered stage, the clock signal CK2 is provided as the first clock CKA, the clock signal CK1 is provided as the second clock CKB, the enable signal ENA2 is provided as the enable signal ENA, and the enable signal ENB2 is provided as the enable signal ENB. The control signals MON1 and MON2 are applied in common to all of the unit circuits 22. In addition, to the unit circuit 22 at each stage, the output signal Q1 from the unit circuit 22 at the previous stage is provided as the set signal S, and the output signal Q1 from the unit circuit 22 at the next stage is provided as the reset signal R. The output signal Q1 from the unit circuit 22 at each stage is provided as the reset signal R to the unit circuit 22 at the previous stage, and is provided as the set signal S to the unit circuit 22 at the next stage. The output signal Q2 from the unit circuit 22 at each stage is provided as a scanning signal to the corresponding scanning signal line GL. The output signal Q3 from the unit circuit 22 at each stage is provided as a monitoring control signal to the corresponding monitoring control line ML. Note that, as illustrated in FIG. 4, the scanning signal line GL is connected to the control terminal of the writing control transistor T1 in the pixel circuit 410, and the monitoring control line ML is connected to the control terminal of the monitoring control transistor T3 in the pixel circuit 410. Hereinafter, a signal line that transmits the control signal MON1 is referred to as a "first control signal line", and a signal line that transmits the control signal MON2 is referred to as a "second control signal line".

Figure 26:
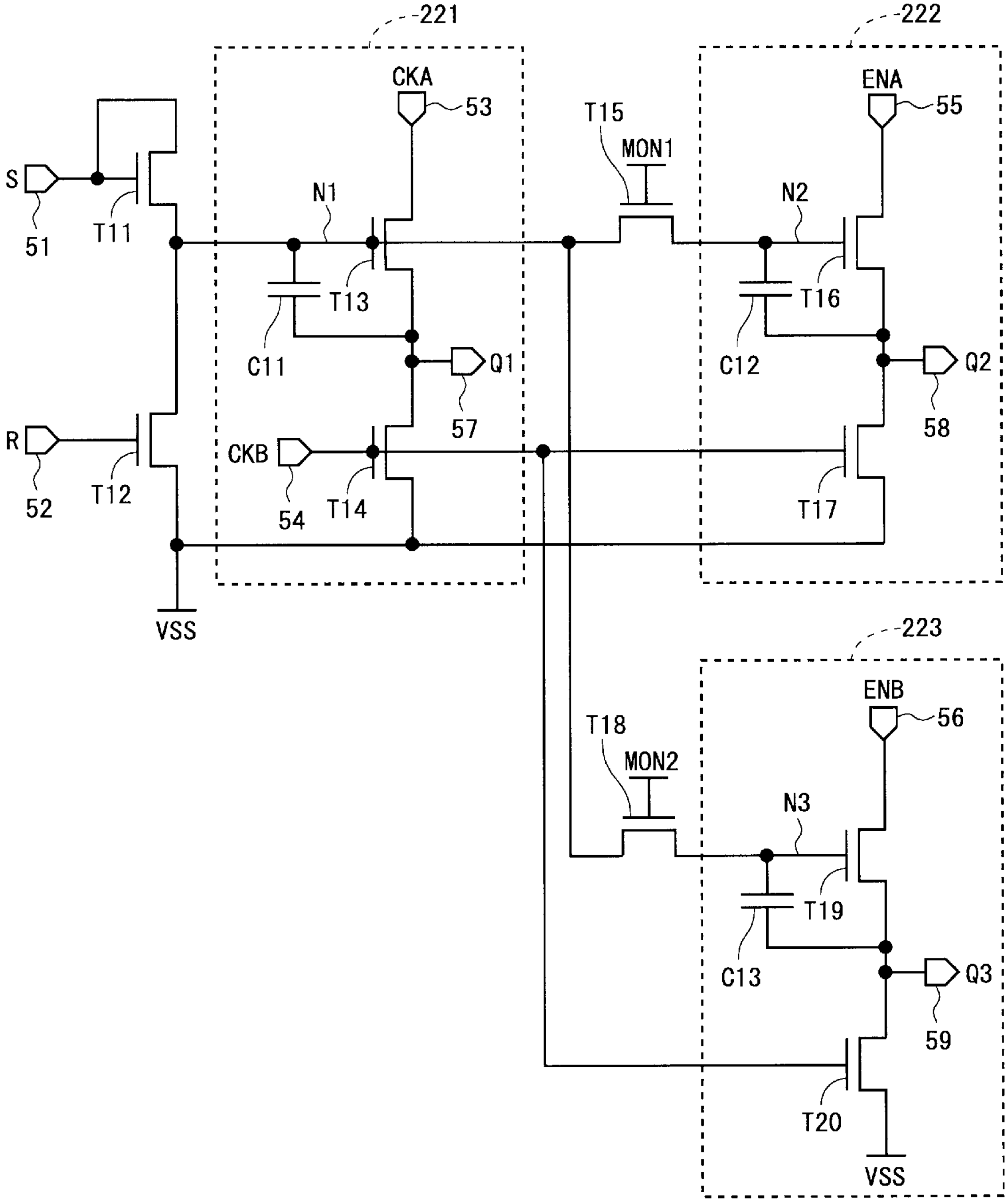
FIG. 26 is a circuit diagram illustrating a configuration of a unit circuit in the gate driver according to the third embodiment described above.

FIG. 26 is a circuit diagram illustrating a configuration of the unit circuit 22 in the present embodiment. The unit circuit 22 in the present embodiment includes, in addition to the constituent elements provided in the first embodiment (see FIG. 1), three transistors T18 to T20, one capacitor C13, an input terminal 56, and an output terminal 59. The enable signal ENB is provided to the input terminal 56, and the output signal Q3 is output from the output terminal 59. Note that the enable signal ENA and the control signal MON1 in the present embodiment correspond to the enable signal EN and the control signal MON in the first embodiment.

A second conduction terminal of the transistor T18, a control terminal of the transistor T19, and one end of the capacitor C13 are connected to one another. Note that a region (wiring line) where they are connected to one another is referred to as a "third internal node". The third internal node is denoted by a reference sign N3.

Incidentally, the unit circuit 22 according to the present embodiment includes, in addition to the first output control circuit 221 and the second output control circuit 222, a third output control circuit 223 that controls the output of the output signal Q3. The third output control circuit 223 includes the third internal node N3, the transistor T19, the transistor T20, the input terminal 56, and the output terminal 59.

As for the transistor T18, a control terminal is connected to the second control signal line, a first conduction terminal is connected to the first internal node N1, and a second conduction terminal is connected to the third internal node N3. As for the transistor T19, a control terminal is connected to the third internal node N3, a first conduction terminal is connected to the input terminal 56, and a second conduction terminal is connected to the output terminal 59. As for the transistor T20, a control terminal is connected to the input terminal 54, a first conduction terminal is connected to the output terminal 59, and a second conduction terminal is connected to a reference potential line. The capacitor C13 is connected to the third internal node N3 at one end, and is connected to the output terminal 59 at the other end. Note that the control terminal of the transistor T15 is connected to the first control signal line.

In the present embodiment, a first output control transistor is achieved by the transistor T13, a first output circuit control transistor is achieved by the transistor T15, a second output control transistor is achieved by the transistor T16, a second output circuit control transistor is achieved by the transistor T18, a third output control transistor is achieved by the transistor T19, a first output terminal is achieved by the output terminal 57, a second output terminal is achieved by the output terminal 58, and a third output terminal is achieved by the output terminal 59.

3.3 Driving Method

As described above, in the present embodiment, as the method of the monitoring processing, the first method in which the real-time monitoring is performed and the second method in which the monitoring processing is performed during the pause period are prepared. In a case where the first method is selected as the method of the monitoring processing, similar to the first embodiment, the operation mode is set to either the monitoring mode or the non-monitoring mode. In a case where the second method is selected as the method of the monitoring processing, similar to the second embodiment, the operation mode is set to any one of the first mode, the second mode, and the third mode.

Note that, in the following, the potential of the control signal MON1 at the high level corresponds to a first potential, the potential of the control signal MON1 at the low level corresponds to a second potential, the potential of the control signal MON2 at the high level corresponds to a third potential, and the potential of the control signal MON2 at the low level corresponds to a fourth potential.

3.3.1 Operation when Method of Monitoring Processing is First Method

When the operation mode is set to the non-monitoring mode, an operation for writing is continuously performed without performing the monitoring processing, similar to a case of the non-monitoring mode in the first embodiment. In other words, the frame period including only the scanning period continues (see FIG. 7). Note that the control signal MON1 is maintained at the high level, and the control signal MON2 is maintained at the low level.

When the operation mode is set to the monitoring mode, the real-time monitoring is performed, similar to a case of the monitoring mode in the first embodiment. In other words, the monitoring period is included in each frame period, and periods other than the monitoring period are the scanning period (see FIG. 6). Note that, the control signal MON1 is maintained at the high level throughout a period in which the operation mode is set to the monitoring mode, and the control signal MON2 is maintained at the low level during the scanning period, and is set to the high level only in the monitoring period (however, strictly, the control signal MON2 is set to the high level in a period from slightly before the start of the monitoring period to slightly after the end of the monitoring period).

Note that, in a case where the first method is employed as the method of the monitoring processing, the fixed potential being at the high level may be applied as the control signal MON1 to the first control signal line.

3.3.1.1 Operation when Operation Mode is Set to Non-Monitoring Mode

Figure 27:
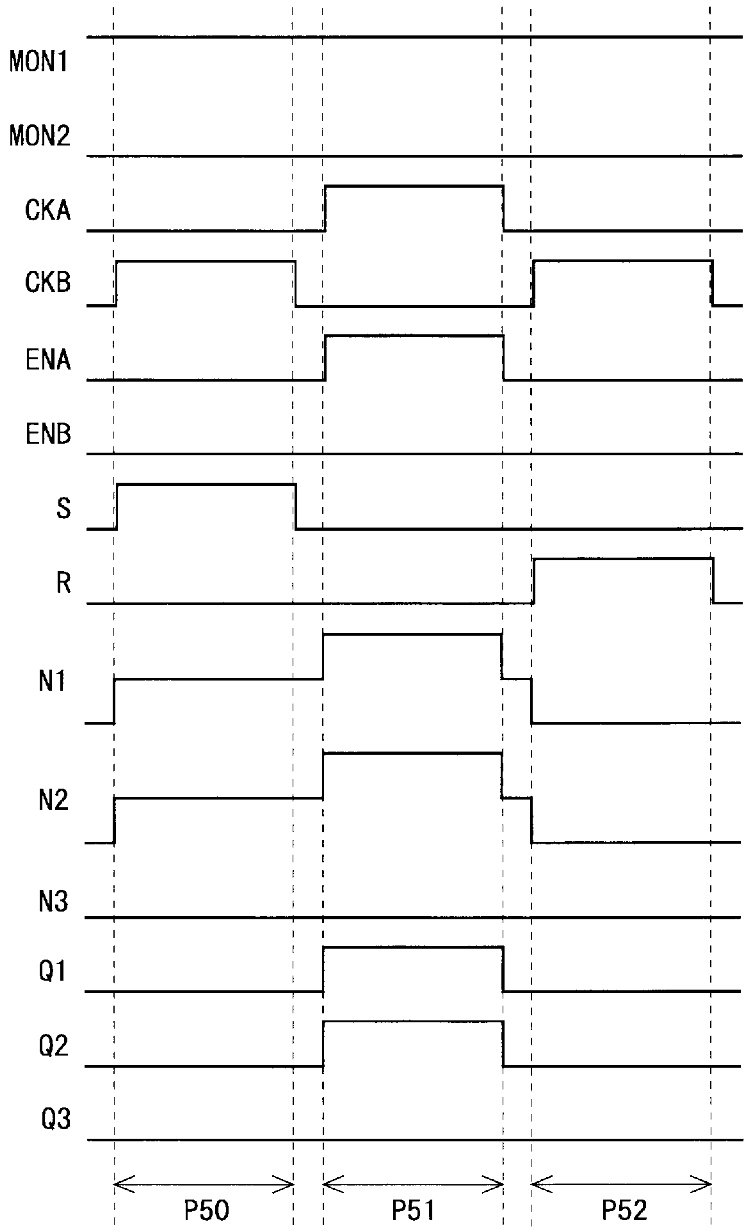
FIG. 27 is a signal waveform diagram for describing an operation of the unit circuit when a first method is employed as a method of monitoring processing and an operation mode is set to a non-monitoring mode in the third embodiment described above.

With reference to FIG. 27, an operation of the unit circuit 22(*i*) in the i-th stage when the operation mode is set to the non-monitoring mode will be described. However, attention is focused on an operation when writing to the i-th row is performed. Immediately before the start of a period P50, the potentials of the first internal node N1, the second internal node N2, and the third internal node N3 are at the low level, the control signal MON1 is at the high level, and the control signal MON2 is at the low level. Since the control signal MON1 is at the high level, the transistor T15 is in the on state, and since the control signal MON2 is at the low level, the transistor T18 is in the off state.

When the period P50 starts, the set signal S changes from the low level to the high level. The pulse of this set signal S causes the transistor T11 to be in the on state, and the capacitor C11 is charged. At this time, since the transistor T15 is in the on state, the capacitor C12 is also charged. Since the transistor T18 is in the off state, the capacitor C13 is not charged. As described above, the potential of the first internal node N1 increases, the transistor T13 is turned on, and the potential of the second internal node N2 increases, and thus, the transistor T16 is turned on. However, since the first clock CKA and the enable signal ENA are maintained at the low level in the period P50, the output signals Q1 and Q2 are maintained at the low level. Note that the output signal Q3 is also maintained at the low level.

When a period P51 starts, the first clock CKA changes from the low level to the high level. At this time, since the transistor T13 is in the on state, the potential of the output terminal 57 (the potential of the output signal Q1) rises along with the rise of the potential of the input terminal 53. According to this, the potential of the first internal node N1 also increases via the capacitor C11. As a result, a high voltage is applied to the control terminal of the transistor T13 to sufficiently increase the potential of the output signal Q1. Further, when the period P51 starts, the enable signal ENA changes from the low level to the high level. At this time, since the transistor T16 is in the on state, the potential of the output terminal 58 (the potential of the output signal Q2) rises along with the rise of the potential of the input terminal 55. According to this, the potential of second internal node N2 also increases via the capacitor C12. As a result, a large voltage is applied to the control terminal of the transistor T16, and the potential of the output signal Q2 increases to a level sufficient to cause the writing control transistor T1 being a connection destination of the output terminal 58 to be turned on. Thus, the writing is performed in the pixel circuit 410 in the i-th row.

When the period P51 ends, the first clock CKA changes from the high level to the low level. As a result, the potential of the output terminal 57 (the potential of the output signal Q1) decreases as the potential of the input terminal 53 decreases. As the potential of the output terminal 57 decreases, the potential of the first internal node N1 also decreases via the capacitor C11. Furthermore, at the end of the period P51, the enable signal ENA changes from the high level to the low level. As a result, the potential of the output terminal 58 (the potential of the output signal Q2) decreases as the potential of the input terminal 55 decreases. As the potential of the output terminal 58 decreases, the potential of the second internal node N2 also decreases via the capacitor C12.

When a period P52 starts, the reset signal R changes from the low level to the high level. Thus, the transistor T12 is set to the on state. As a result, the potential of the first internal node N1 and the potential of the second internal node N2 are set to the low level.

3.3.1.2 Operation when Operation Mode is Set to Monitoring Mode

Figure 28:
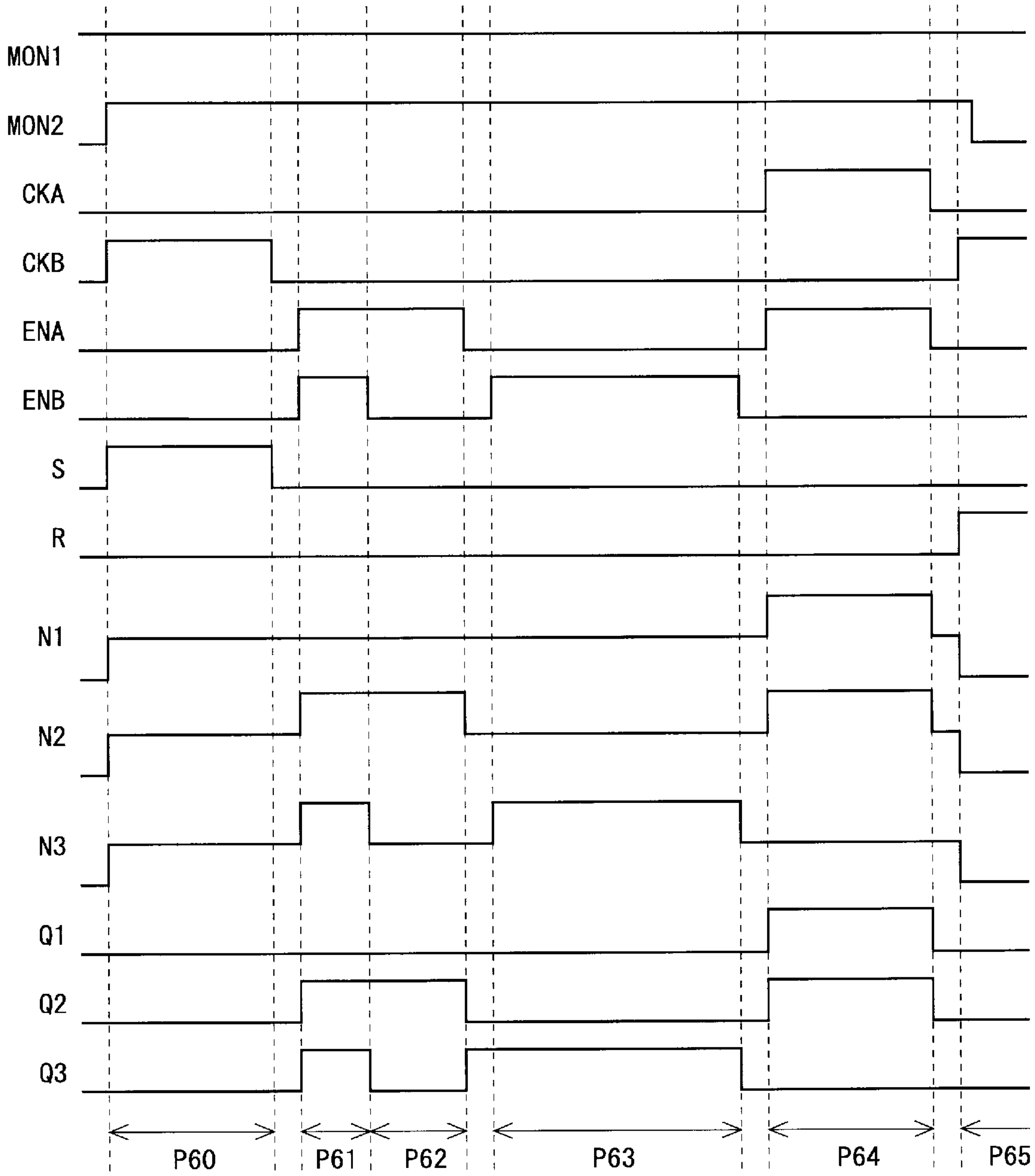
FIG. 28 is a signal waveform diagram for describing an operation of the unit circuit when the first method is employed as the method of the monitoring processing and the operation mode is set to a monitoring mode in the third embodiment described above.

With reference to FIG. 28, an operation of the unit circuit 22(*i*) at the i-th stage when the operation mode is set to the monitoring mode will be described. However, it is assumed that the i-th row is the monitoring row, and attention is focused on the operation when the monitoring processing is performed for the i-th row. A potential of each signal immediately before the start of the period P60 is identical to that immediately before the start of the above-described period P50.

When the period P60 starts, the control signal MON2 changes from the low level to the high level. Due to this, the transistor T18 is set to the on state. Further, when the period P60 starts, the set signal S changes from the low level to the high level. The pulse of this set signal S causes the transistor T11 to be in the on state, and the capacitor C11 is charged. At this time, the capacitors C12 and C13 are also charged, because the transistors T15 and T18 are in the on state. As described above, the potentials of the first internal node N1, the second internal node N2, and the third internal node N3 increase, and the transistors T13, T16, and T19 are turned on. However, since the first clock CKA, the enable signal ENA, and the enable signal ENB are maintained at the low level in the period P60, the output signals Q1, Q2, and Q3 are maintained at the low level.

When a period P61 starts, the enable signal ENA changes from the low level to the high level. At this time, since the transistor T16 is in the on state, the potential of the output terminal 58 (the potential of the output signal Q2) rises along with the rise of the potential of the input terminal 55. According to this, the potential of second internal node N2 also increases via the capacitor C12. As a result, a large voltage is applied to the control terminal of the transistor T16, and the potential of the output signal Q2 increases to a level sufficient to cause the writing control transistor T1 being a connection destination of the output terminal 58 to be turned on. Additionally, when the period P61 starts, the enable signal ENB changes from the low level to the high level. At this time, since the transistor T19 is in the on state, the potential of the output terminal 59 (the potential of the output signal Q3) rises along with the rise of the potential of the input terminal 56. In response to this, the potential of the third internal node N3 also increases via the capacitor C13. As a result, a large voltage is applied to the control terminal of the transistor T19, and the potential of the output signal Q3 increases to a level sufficient to cause the monitoring control transistor T3 being a connection destination of the output terminal 59 to be turned on.

When a period P62 starts, the enable signal ENB changes from the high level to the low level. As a result, the potential of the output terminal 59 (the potential of the output signal Q3) decreases as the potential of the input terminal 56 decreases. As the potential of the output terminal 59 decreases, the potential of the third internal node N3 also decreases via the capacitor C13. At the end of the period P62, the enable signal ENA changes from the high level to the low level. As a result, the potential of the output terminal 58 (the potential of the output signal Q2) decreases as the potential of the input terminal 55 decreases. As the potential of the output terminal 58 decreases, the potential of the second internal node N2 also decreases via the capacitor C12.

When a period P63 starts, the enable signal ENB changes from the low level to the high level. Due to this, similar to the period P61, the potential of the third internal node N3 and the potential of the output signal Q3 increase. At the end of the period P63, the enable signal ENB changes from the high level to the low level. As a result, the potential of the output terminal 59 (the potential of the output signal Q3) decreases as the potential of the input terminal 56 decreases. In response to this, the potential of third internal node N3 also decreases via the capacitor C13.

When a period P64 starts, the clock signal CKA and the enable signal ENA change from the low level to the high level. Due to this, similar to the above-described period P51, the potential of the first internal node N1, the potential of the second internal node N2, the potential of the output signal Q1, and the potential of the output signal Q2 increase. Note that, the potential of the third internal node N3 does not rise, because the enable signal ENB is maintained at the low level in the period P64. At the end of the period P64, the first clock CKA and the enable signal ENA change from the high level to the low level. As a result, similarly when the period P5*i* ends, the potential of the first internal node N1, the potential of the second internal node N2, the potential of the output signal Q1, and the potential of the output signal Q2 are decreased.

When a period P65 starts, the reset signal R changes from the low level to the high level. As a result, similar to the above-described period P52, the potentials of the first internal node N1 and the second internal node N2 are set to the low level. After a small amount of time has passed from the start of the period P65, the control signal MON2 changes from the high level to the low level. This causes the transistor T18 to be set to the off state.

As described above, in the pixel circuit 410 in the i-th row, the writing control transistor T1 is set to the on state in the periods P61, P62, and P64, and the monitoring control transistor T3 is set to the on state in the periods P61 and P63. In this way, the monitoring processing for the pixel circuit 410 in the i-th row is performed in the periods P61 to P64. Operations of the pixel circuit 410 and the current monitoring unit 320 when the monitoring processing is performed are the same as those of the first embodiment, and thus, descriptions thereof will be omitted.

3.3.2 Operation when Method of Monitoring Processing is Second Method

When the operation mode is set to the first mode, the operation for writing is continuously performed without performing the monitoring processing, similar to a case of the first mode of the second embodiment. That is, without the pause period being provided, the frame period in which the normal image display is performed (frame period including only the scanning period) continues (see FIG. 17). Note that the control signal MON1 is maintained at the high level, and the control signal MON2 is maintained at the low level.

When the operation mode is set to the second mode, similar to a case of the second mode of the second embodiment, a pause period appears between the two frame periods, but only a shifting operation in the shift register is performed without performing the monitoring processing in the pause period (see FIG. 18). Note that, the control signal MON2 is maintained at the low level throughout a period in which the operation mode is set to the second mode, and the control signal MON1 is maintained at the high level in the frame period (scanning period), and is maintained at the low level in the pause period.

Figure 19:
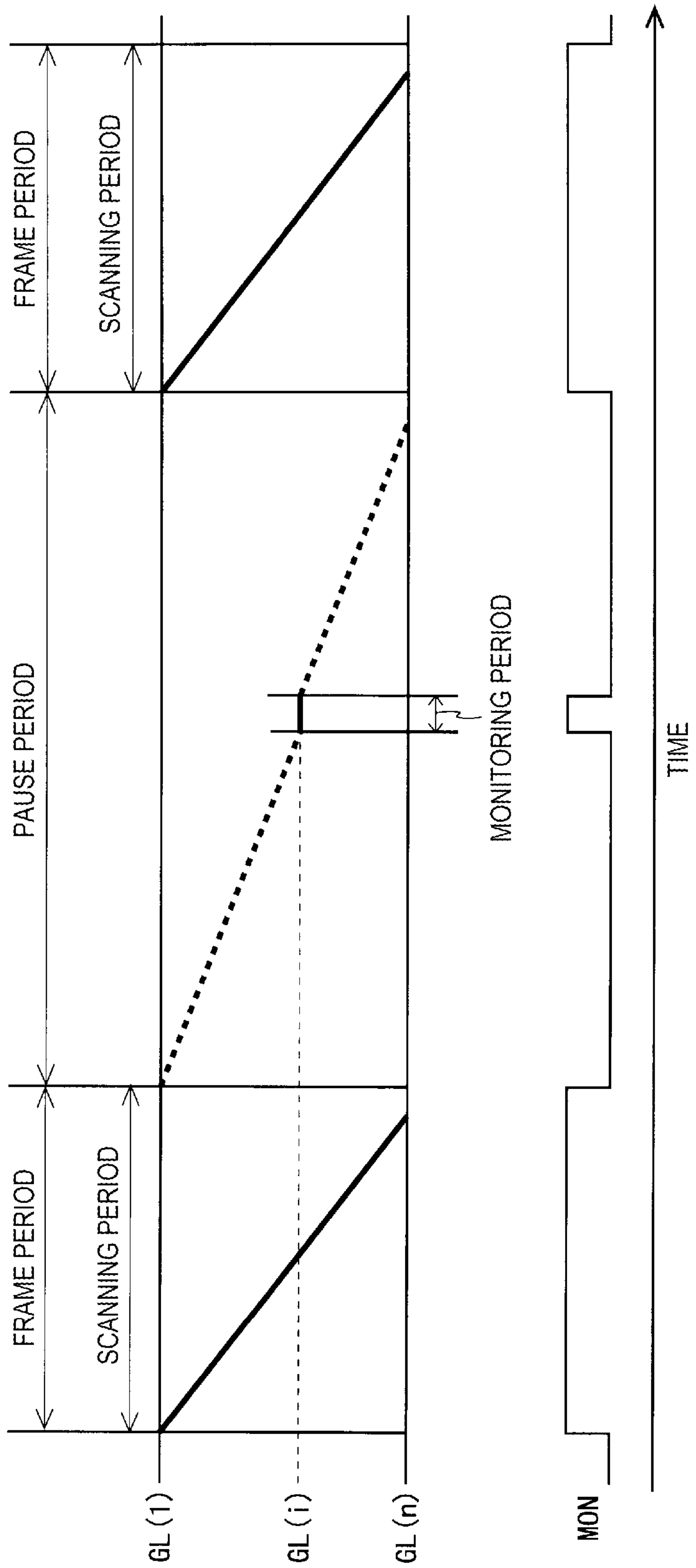
FIG. 19 is a diagram for describing a schematic operation when the operation mode is set to a third mode in the second embodiment described above.

When the operation mode is set to the third mode, similar to a case of the third mode of the second embodiment, a pause period including a monitoring period in which the monitoring processing is performed appears between two frame periods (see FIG. 19). Note that the control signal MON1 is maintained at the high level in the frame period (scanning period), and, in the pause period, is set to the high level only in the monitoring period, and is maintained at the low level in periods other than the monitoring period. Further, the control signal MON2 is maintained at the low level in the frame period (scanning period), and, in the pause period, is set to the high level only in the monitoring period, and is maintained at the low level in periods other than the monitoring period.

3.3.2.1 Operation when Operation Mode is Set to First Mode

In this case, the unit circuit 22 operates in a similar manner to that when the first method is employed as the method of the monitoring processing and the operation mode is set to the non-monitoring mode (see FIG. 27).

3.3.2.2 Operation when Operation Mode is Set to Second Mode

In this case, in a frame period (scanning period) in which normal image display is performed, the unit circuit 22 operates in a similar manner to that when the first method is employed as the method of the monitoring processing and the operation mode is set to the non-monitoring mode (see FIG. 27).

Figure 29:
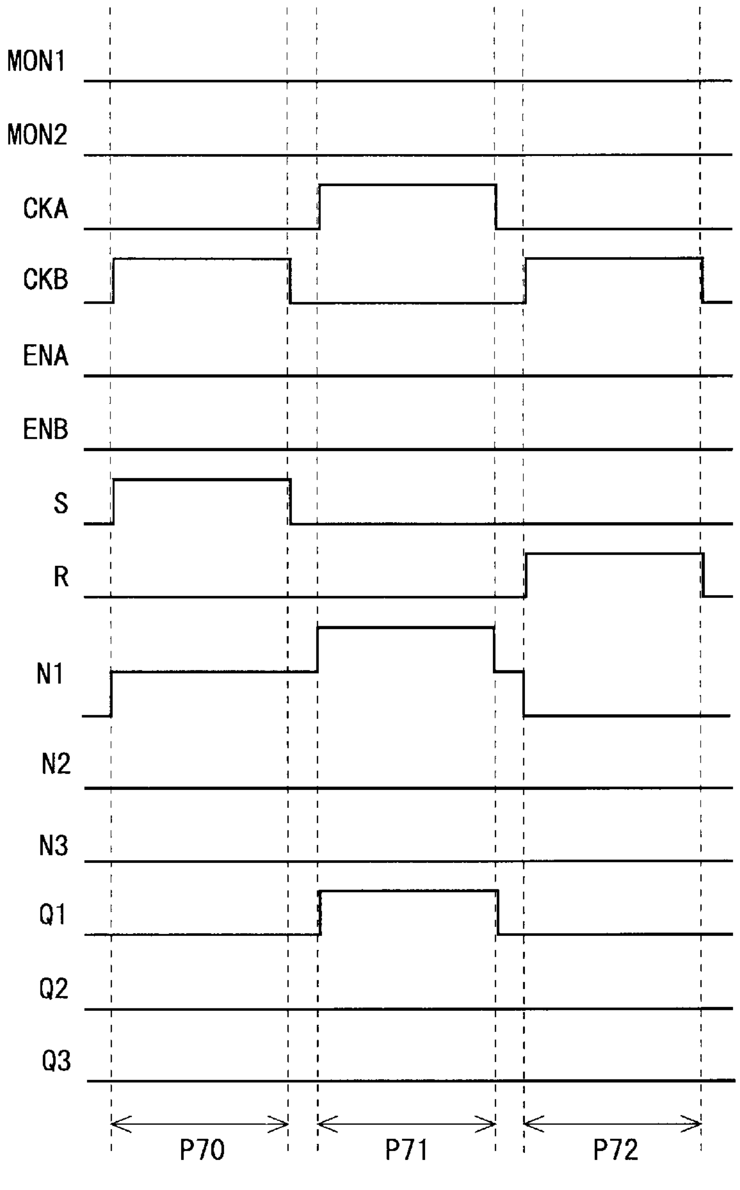
FIG. 29 is a signal waveform diagram for describing an operation of the unit circuit when a shift pulse is provided in a pause period in a case where a second method is employed as the method of the monitoring processing and the operation mode is set to a second mode in the third embodiment described above.

With reference to FIG. 29, in this case, an operation of the unit circuit 22(*i*) at the i-th stage when a shift pulse (pulse of the set signal S) is provided to the unit circuit 22(*i*) at the i-th stage in the pause period will be described. Immediately before the start of a period P70, the potentials of the first internal node N1, the second internal node N2, and the third internal node N3 are at the low level, and the control signals MON1 and MON2 are at the low level. Since the control signals MON1 and MON2 are at the low level, the transistors T15 and T18 are in the off state.

When a period P70 starts, the set signal S changes from the low level to the high level. Due to this, similar to the above-described period P50, the potential of the first internal node N1 increases, and the transistor T13 is turned on. However, in the period P70, the first clock CKA is maintained at the low level, and thus, the output signal Q1 is maintained at the low level. Since the transistors T15 and T18 are in the off state, the potential of the second internal node N2 and the potential of the third internal node N3 do not rise. Thus, the output signals Q2 and Q3 are maintained at the low level.

When a period P71 starts, the first clock CKA changes from the low level to the high level. Due to this, similar to the above-described period P51, the potential of the output signal Q1 sufficiently increases. When the period P71 ends, the first clock CKA changes from the high level to the low level. As a result, similar to the end of the period P51, the potential of the output terminal 57 (the potential of the output signal Q1) and the potential of the first internal node N1 are decreased. When a period P72 starts, the reset signal R changes from the low level to the high level. Thus, similar to the above-described period P52, the potential of the first internal node N1 is set to the low level.

3.3.2.3 Operation when Operation Mode is Set to Third Mode

In this case, in a frame period (scanning period) in which normal image display is performed, the unit circuit 22 operates in a similar manner to that when the first method is employed as the method of the monitoring processing and the operation mode is set to the non-monitoring mode (see FIG. 27). In this case, in a period other than the monitoring period of a pause period, the unit circuit 22 operates in a similar manner to that in the pause period when the operation mode is set to the second mode (see FIG. 29).

Figure 30:
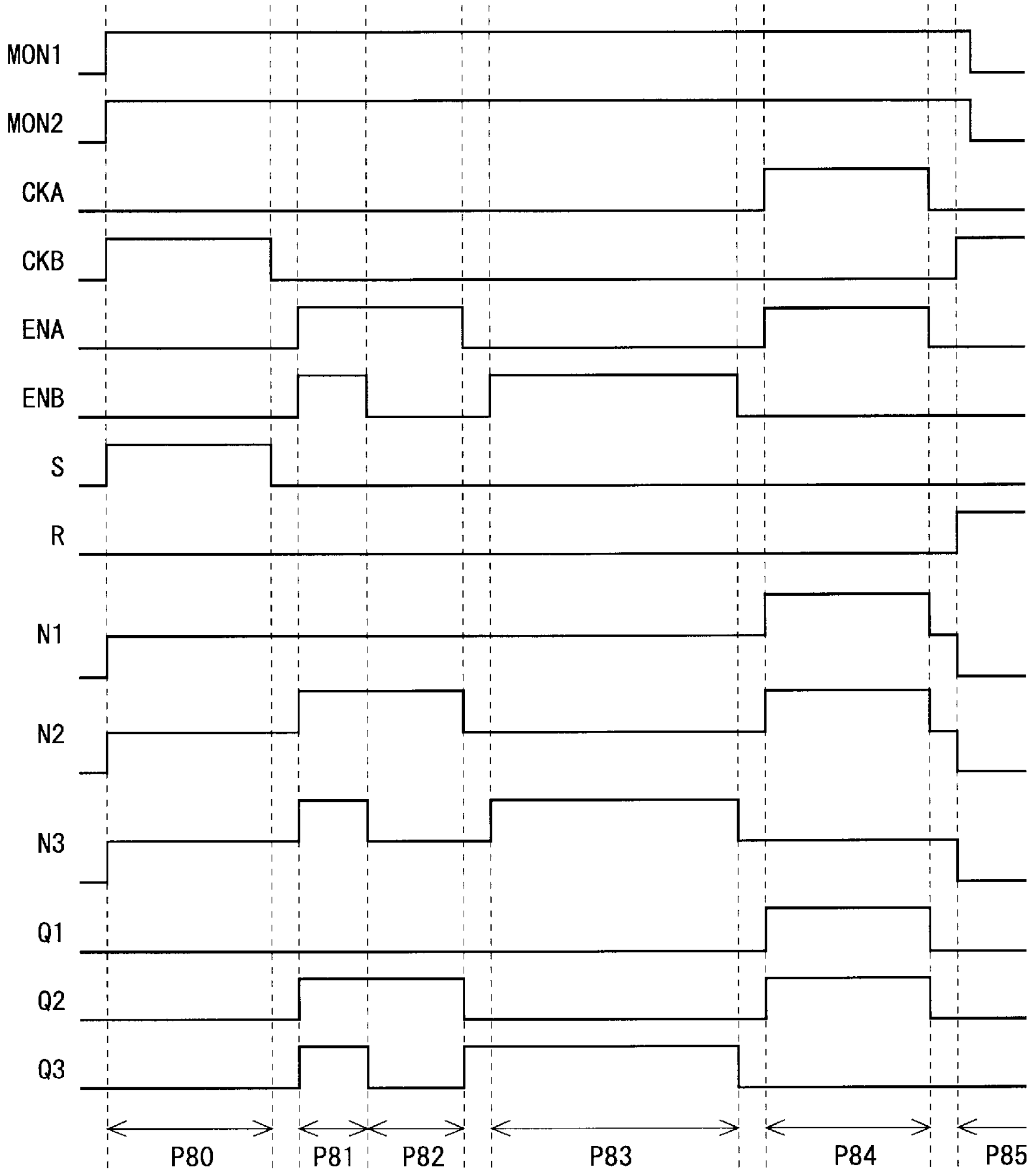
FIG. 30 is a signal waveform diagram for describing an operation of the unit circuit for a monitoring period of a pause period when the second method is employed as the method of the monitoring processing and the operation mode is set to a third mode in the third embodiment described above.

With reference to FIG. 30, an operation of the unit circuit 22(*i*) at the i-th stage in the monitoring period of the pause period in this case will be described. However, it is assumed that the i-th row is the monitoring row, and attention is focused on the operation when the monitoring processing is performed for the i-th row. The potential of each signal immediately before the start of a period P80 is the same as that immediately before the start of the above-described period P70.

When the period P80 starts, the control signals MON1 and MON2 changes from the low level to the high level. Thus, the transistors T15 and T18 are set to the on state. Additionally, when the period P80 starts, the set signal S changes from the low level to the high level. Due to this, similar to the above-described period P60, the potentials of the first internal node N1, the second internal node N2, and the third internal node N3 increase, and the transistors T13, T16, and T19 are turned on.

Similar operations to those in the above-described periods P61 to P64 are performed in periods P81 to P84. When the period P85 starts, the reset signal R changes from the low level to the high level. As a result, similar to the above-described period P65, the potentials of the first internal node N1 and the second internal node N2 are set to the low level. After a small amount of time has passed from the start of the period P85, the control signals MON1 and MON2 change from the high level to the low level. This causes the transistors T15 and T18 to be set to the off state.

As described above, in the pixel circuit 410 in the i-th row, the writing control transistor T1 is set to the on state in the periods P81, P82, and P84, and the monitoring control transistor T3 is set to the on state in the periods P81 and P83. In this way, the monitoring processing for the pixel circuit 410 in the i-th row is performed in the periods P81 to P84. Operations of the pixel circuit 410 and the current monitoring unit 320 when the monitoring processing is performed are the same as those of the first embodiment, and thus, descriptions thereof will be omitted.

3.4 Effects

According to the present embodiment, the unit circuit 22 having the configuration illustrated in FIG. 26 is employed as each stage of the shift register configuring the gate driver so that both the real-time monitoring and the pause driving can be performed. Additionally, when the real-time monitoring is performed, the transistor T18 in the unit circuit 22 is maintained in the off state in the periods other than the monitoring period. Also, in the pause period during the pause driving, the transistors T15 and T18 in the unit circuit 22 are maintained in the off state in the periods other than the monitoring period. The application of stress to the transistors T16 and T19 that function as a buffer transistor is significantly suppressed. Thus, the sizes of the transistors T16 and T19 can be reduced. As described above, the frame size of the organic EL display device capable of performing both the real-time monitoring and the monitoring processing during a pause period can be made smaller than those of the known organic EL display devices.

4. Others

Note that the above description is based on the assumption that the monitoring row is sequentially shifted one by one row from the first row to the n-th row, but the embodiment is not limited to this. The monitoring row may be randomly shifted.

Although the above-described respective embodiments (including the modified example) have been described with the organic EL display devices having been exemplified, the disclosure is not limited to these devices. The disclosure can also be applied to display devices as long as the display devices include display elements to be driven by a current (display elements whose luminance or transmittance is controlled by a current). For example, the disclosure can also be applied to inorganic EL display devices including inorganic light emitting diodes, Quantum dot Light Emitting Diode (QLED) display devices including QLEDs, and the like.

REFERENCE SIGNS LIST

10 Display control circuit
20 Gate driver
22 Unit circuit
30 Source driver
40 Display portion
221 to 223 First to third output control circuit
320 Current monitoring unit
410 Pixel circuit
GL, GL(1) to GL(i) Scanning signal line
ML, ML(1) to ML(n) Monitoring control line
SL, SL(1) to SL(m) Data signal line
MCL, MCL(1) to MCL(m) Current monitoring line
L1 Organic EL element
T1 Writing control transistor
T2 Drive transistor
T3 Monitoring control transistor
T11 to T19 Transistor in unit circuit
N1 to N3 First to third internal node
MON, MON1, MON2 Control signal

The invention claimed is:

1. A display device including a pixel circuit including a display element configured to be driven by a current and a drive transistor configured to control a drive current of the display element and having a function of performing monitoring processing being a series of processes of measuring a current flowing in the pixel circuit outside the pixel circuit to compensate for deterioration of the drive transistor or the display element, the display device comprising:

a display portion including a pixel matrix including n rows and m columns, the pixel matrix including n×m number of the pixel circuits, where each of n and m is an integer being larger than or equal to two, a scanning signal line provided corresponding to each of the rows of the pixel matrix, and a data signal line provided corresponding to each of the columns of the pixel matrix;

a data signal line drive circuit configured to apply a data signal to the data signal line;

a scanning signal line drive circuit configured to apply a scanning signal to the scanning signal line; and a first control signal line, wherein the scanning signal line drive circuit is configured of a shift register including a plurality of unit circuits each connected to a corresponding scanning signal line, each of the plurality of unit circuits includes a first output control circuit including a first internal node, a first output terminal connected to another unit circuit, and a first output control transistor including a control terminal connected to the first internal node, a first conduction terminal, and a second conduction terminal connected to the first output terminal, a second output control circuit including a second internal node, a second output terminal configured to output an on level signal for at least a part of a monitoring period for which the monitoring processing is performed, and a second output control transistor including a control terminal connected to the second internal node, a first conduction terminal, and a second conduction terminal connected to the second output terminal, and a first output circuit control transistor including a control terminal connected to the first control signal line, a first conduction terminal connected to the first internal node, and a second conduction terminal connected to the second internal node, a potential to be applied to the first control signal line is switched between a first potential for causing the first output circuit control transistor to be in an on state and a second potential for causing the first output circuit control transistor to be in an off state, and the first potential is applied to the first control signal line throughout the monitoring period.

2. The display device according to claim 1, wherein the first control signal line provides a common potential to the plurality of unit circuits.

3. The display device according to claim 1, wherein a row, of then rows, to be a target of the monitoring processing is randomly shifted.

4. The display device according to claim 1, wherein the display portion further includes a monitoring control line provided corresponding to each of the rows of the pixel matrix, the scanning signal line drive circuit applies a monitoring control signal to the monitoring control line, the first output terminal is connected to a corresponding scanning signal line, and the second output terminal is connected to a corresponding monitoring control line.

5. The display device according to claim 4, wherein in a case where the target of the monitoring processing is an i-th row among the n rows included in the pixel matrix, the monitoring processing is performed for the i-th row after the scanning signal line drive circuit sequentially drives the scanning signal lines from the first row to an (i−1)-th row among the n rows included in the pixel matrix and an image display is performed, and after the monitoring processing is completed, the scanning signal line drive circuit sequentially drives the scanning signal lines of the i-th row and subsequent rows, and the image display is performed, and i is an integer larger than or equal to one.

6. The display device according to claim 4, wherein a vertical period of image display including the monitoring processing is longer than a vertical period of image display not including the monitoring processing.

7. The display device according to claim 4, wherein the second potential is applied to the first control signal line in a period other than the monitoring period.

8. The display device according to claim 4, wherein the data signal line is also used as a signal line configured to cause a current depending on characteristics of the drive transistor or the display element to flow in the monitoring processing, and the current flowing in the data signal line is measured in the monitoring processing.

9. The display device according to claim 1, wherein the display portion further includes a current monitoring line provided corresponding to each of the columns of the pixel matrix, the data signal line drive circuit has a function of measuring a current flowing in the current monitoring line, the pixel circuit includes the display element including a first terminal and a second terminal, the drive transistor including a control terminal, a first conduction terminal, and a second conduction terminal, a writing control transistor including a control terminal connected to the scanning signal line, a first conduction terminal connected to the data signal line, and a second conduction terminal connected to the control terminal of the drive transistor, a monitoring control transistor including a control terminal connected to the scanning signal line, a first conduction terminal connected to the second conduction terminal of the drive transistor and the first terminal of the display element, and a second conduction terminal connected to the current monitoring line, and a capacitive element connected, at one end, to the control terminal of the drive transistor and configured to hold a potential of the control terminal of the drive transistor, and the second output terminal is connected to a corresponding scanning signal line.

10. The display device according to claim 9, wherein pause driving is performable in which an operation of writing the data signal to the pixel circuit is intermittently performed, and as an operation mode related to the monitoring processing in a case where the pause driving is performed, a monitoring mode in which the monitoring processing is performed and a non-monitoring mode in which the monitoring processing is not performed are prepared.

11. The display device according to claim 10, wherein in a case where a target of the monitoring processing is an i-th row among the n rows included in the pixel matrix, the monitoring processing is performed for the i-th row after a shifting operation is sequentially performed from the unit circuits corresponding to the first row, of the plurality of unit circuits, to the unit circuits corresponding to an (i−1)-th row among the n rows included in the pixel matrix, of the plurality of unit circuits, in the shift register, and after the monitoring processing is completed, the shifting operation is sequentially performed in the unit circuits corresponding to the i-th row and subsequent rows, of the plurality of unit circuits, in the shift register, and i is an integer larger than or equal to one.

12. The display device according to claim 10, wherein for a pause period during which an operation of writing the data signal to the pixel circuit is interrupted, a pause period including the monitoring processing is longer than a pause period not including the monitoring processing.

13. The display device according to claim 10, wherein in a case where the pause driving is performed, the first potential is applied to the first control signal line in the monitoring period of a pause period during which an operation of writing the data signal to the pixel circuit is interrupted, the second potential is applied to the first control signal line in a period other than the monitoring period of the pause period, and the first potential is applied to the first control signal line throughout a period other than the pause period.

14. The display device according to claim 1, further comprising:

a second control signal line, wherein the display portion further includes a monitoring control line provided corresponding to each of the rows of the pixel matrix, the scanning signal line drive circuit applies a monitoring control signal to the monitoring control line, each of the plurality of unit circuits further includes a third output control circuit including a third internal node, a third output terminal configured to output an on level signal for at least a part of the monitoring period for which the monitoring processing is performed, and a third output control transistor including a control terminal connected to the third internal node, a first conduction terminal, and a second conduction terminal connected to the third output terminal, and a second output circuit control transistor including a control terminal connected to the second control signal line, a first conduction terminal connected to the first internal node, and a second conduction terminal connected to the third internal node, a potential to be applied to the second control signal line is switched between a third potential for causing the second output circuit control transistor to be in an on state and a fourth potential for causing the second output circuit control transistor to be in an off state, and the third potential is applied to the second control signal line throughout the monitoring period.

15. The display device according to claim 14, wherein the data signal line is also used as a signal line configured to cause a current depending on characteristics of the drive transistor or the display element to flow in the monitoring processing, and in the monitoring processing, the current flowing in the data signal line is measured.

16. The display device according to claim 14, wherein the second output terminal is connected to a corresponding scanning signal line, and the third output terminal is connected to a corresponding monitoring control line.

17. The display device according to claim 16, wherein the pixel circuit includes the display element including a first terminal and a second terminal, the drive transistor including a control terminal, a first conduction terminal, and a second conduction terminal, a writing control transistor including a control terminal connected to the scanning signal line, a first conduction terminal connected to the data signal line, and a second conduction terminal connected to the control terminal of the drive transistor, a monitoring control transistor including a control terminal connected to the monitoring control line, a first conduction terminal connected to the second conduction terminal of the drive transistor and the first terminal of the display element, and a second conduction terminal connected to the data signal line, and a capacitive element connected, at one end, to the control terminal of the drive transistor and configured to hold a potential of the control terminal of the drive transistor, the monitoring period includes at least an initialization period in which the pixel circuit is initialized, a first writing period in which a data signal for causing a current depending on characteristics of the drive transistor or the display element to flow is written to the pixel circuit, a measurement period in which the current is measured outside the pixel circuit, and a second writing period in which a data signal for image display is written to the pixel circuit, in the row, of the n rows, being a target of the monitoring processing, in the initialization period, the scanning signal is applied to the scanning signal line such that the writing control transistor is turned on, the monitoring control signal is applied to the monitoring control line such that the monitoring control transistor is turned on, and the data signal is applied to the data signal line such that the drive transistor is turned off, in the first writing period, the monitoring control signal is applied to the monitoring control line such that the monitoring control transistor is turned off, and in the measurement period, the scanning signal is applied to the scanning signal line such that the writing control transistor is turned off, and the monitoring control signal is applied to the monitoring control line such that the monitoring control transistor is turned on.

18. The display device according to claim 16, wherein the third potential is applied to the second control signal line by start of the monitoring period, and the fourth potential is applied to the second control signal line after end of the monitoring period.

19. The display device according to claim 16, wherein the monitoring processing is performed in a period in which image display is being performed.

20. The display device according to claim 16, wherein pause driving is performable in which an operation of writing the data signal to the pixel circuit is intermittently performed, and the monitoring processing is performed in a period in which the pause driving is being performed.

* * * * *